United States Patent [19]
Togai et al.

[11] Patent Number: 5,694,901
[45] Date of Patent: Dec. 9, 1997

[54] METHOD FOR THE DETERMINATION OF ROUGH ROAD IN VEHICLE WITH INTERNAL COMBUSTION ENGINE MOUNTED THEREON

[75] Inventors: Kazuhide Togai; Kojiro Okada; Shogo Omori, all of Tokyo, Japan

[73] Assignee: Mitsubishi Jidosha Kogyo Kabushiki Kaisha, Tokyo, Japan

[21] Appl. No.: 553,370

[22] PCT Filed: Mar. 30, 1995

[86] PCT No.: PCT/JP95/00614

§ 371 Date: Feb. 26, 1996

§ 102(e) Date: Feb. 26, 1996

[87] PCT Pub. No.: WO95/27130

PCT Pub. Date: Oct. 12, 1995

[30] Foreign Application Priority Data

Mar. 31, 1994  [JP]  Japan ................................ 6-063606
Apr. 14, 1994  [JP]  Japan ................................ 6-075763

[51] Int. Cl.$^6$ ................................................ F02D 41/14
[52] U.S. Cl. ................................................ 123/436; 73/116
[58] Field of Search ........................ 123/419, 436; 73/116, 117.3; 364/431.05, 431.06, 431.07, 431.08

[56] References Cited

U.S. PATENT DOCUMENTS

| 5,016,593 | 5/1991 | Takaoka ........................... 123/436 |
| 5,311,773 | 5/1994 | Bradshaw et al. ................. 123/419 |

FOREIGN PATENT DOCUMENTS

| 5-107155 | 4/1993 | Japan . |
| 5-231210 | 9/1993 | Japan . |
| 5-312085 | 11/1993 | Japan . |

*Primary Examiner*—Andrew M. Dolinar

[57] ABSTRACT

The invention relates to a method for the determination of a rough road in a vehicle with a multi-cylinder internal combustion engine (1) mounted thereon. With a view to economically performing determination of a rough road with high accuracy, a revolution variance (IAC,VAC) is detected with respect to each cylinder in the internal combustion engine (1). Based on detection of revolution variance states, each of which indicates a deterioration in combustion, in plural cylinders, the vehicle with the internal combustion engine (1) mounted thereon is determined or estimated to be running on a rough road.

17 Claims, 17 Drawing Sheets

1

METHOD FOR THE DETERMINATION OF ROUGH ROAD IN VEHICLE WITH INTERNAL COMBUSTION ENGINE MOUNTED THEREON

TECHNICAL FIELD

This invention relates to a method for determining, in a vehicle with an internal combustion engine mounted thereon, whether the vehicle is running on a rough road or not, and especially to a rough road determination method suitable for use with an internal combustion engine or the like which performs burning at a lean limit.

BACKGROUND ART

A variety of controls have conventionally been performed on individual components of an automotive vehicle, such as the engine, transmission, power steering, suspensions and brakes. As a parameter for changing over the control modes of each of these controls, it is meaningful to determine what kind of road surface condition a road on which the automotive vehicle is running has.

Further, upon detection of a misfire or the like of an engine from the state of a revolution variance or the like of the engine, there is the problem that no accurate determination can be made with respect to the misfire if the vehicle is running on a rough road, because information on the road surface is included in the state of the revolution variance. In determining a misfire on the basis of the state of a revolution variance, it is therefore important to improve the accuracy in determining whether the vehicle is running on a rough road or not.

Lean-burn internal combustion engines (i.e., so-called lean-burn engines) have been provided in recent years, which perform a lean-burn operation at an air/fuel ratio on a side leaner than a stoichiometric air/fuel ratio under predetermined operation conditions.

In such lean-burn engines, the air/fuel ratio is set as high as possible (in other words, an air-fuel mixture is set as lean as possible) during a lean-burn operation so that the emission of NOx can be decreased. The value of the air/fuel ratio is generally set close to a limit (lean limit) within which the air-fuel mixture can undergo stable combustion.

To perform a lean-burn operation, it is common practice to control the state of combustion by a control system. A method of this control that has been contemplated is to estimate engine torque from an angular acceleration of the crankshaft, to perform this estimation moment by moment by using varying momentary values, and then to perform stable and precise control at predetermined intervals while taking into consideration the probabilistic and statistical nature of the engine torque.

Further, the state of combustion in a lean-burn operation is controlled in relation to the air/fuel ratio of the cylinder that is undergoing the greatest combustion variance. When a vehicle equipped with such control means runs on a rough road, influence of the rough road appears as a revolution variance of the engine, thereby possibly making it difficult to determine whether the revolution variance has been caused by a deterioration in combustion or by the rough road.

Described specifically, when a large revolution variance takes place due to running on a rough road, the control system may be excessively corrected to a rich side, resulting in the potential problem that the emission of NOx may be increased.

As has been described above, it is considered necessary for various purposes to determine whether a vehicle is running on a rough road or not. There is hence an outstanding demand for a determination method of low price and high accuracy. An object of the present invention is to provide such a determination method.

DISCLOSURE OF THE INVENTION

Therefore, a method according to the present invention for the determination of a rough road in a vehicle with a multi-cylinder internal combustion engine mounted thereon comprises: detecting any revolution variance with respect to each cylinder in said internal combustion engine; and based on detection of revolution variance states in plural cylinders, respectively, each of the revolution variance states indicating a deterioration in combustion, determining or estimating that the vehicle with the internal combustion engine mounted thereon is running on a rough road.

In the method of the present invention for the determination of a rough road in the vehicle with the multi-cylinder internal combustion engine mounted thereon, any revolution variance with respect to each cylinder in the internal combustion engine is detected; and based on detection of revolution variance states in plural cylinders, respectively, each of the revolution variance states indicating a deterioration in combustion, it is determined or estimated that said vehicle with said internal combustion engine mounted thereon is running on a rough road.

According to the method of the present invention for the determination of a rough road in the vehicle with the multi-cylinder internal combustion engine mounted thereon, no additional sensor is needed to cope with rough roads. It is also possible to perform driving in conformity with each rough road without raising the cost. Even during running on a rough road, desired driving corresponding to the rough road can be performed. It is hence possible to reduce the emission of NOx while improving the gas mileage.

A more specific method for the determination of a rough road in a vehicle with a multi-cylinder internal combustion engine mounted thereon is similar to the initially described method and includes detecting any revolution variance occurring with respect to each cylinder in the internal combustion engine when operated at an air/fuel ratio leaner than a stoichiometric air/fuel ratio, whereby said internal combustion engine is operated in the vicinity of a lean burn limit air/fuel ratio on the basis of the results of the detection, but is characterized in that the vehicle with the internal combustion engine mounted thereon is determined or estimated to be running on a rough road based on detection of revolution variance states in plural cylinders, respectively, each of the revolution variance states indicating a deterioration in combustion, during the operation of said internal combustion engine in the vicinity of the lean burn limit air/fuel ratio.

In the immediately above-noted method for the determination of a rough road in the vehicle with the multi-cylinder internal combustion engine mounted thereon, in addition to the procedures of the initially described method, any revolution variance occurring with respect to each cylinder in the internal combustion engine when operated at an air/fuel ratio leaner than a stoichiometric air/fuel ratio is detected; and in an operation of the internal combustion engine in the vicinity of a lean burn limit on the basis of the results of the detection, the vehicle with the internal combustion engine mounted thereon is determined or estimated to be running on a rough road on the basis of detection of revolution variance states in plural cylinders, each of said revolution variance states indicating a deterioration in combustion, during the operation.

According to the immediately above-noted method for the determination of a rough road in the vehicle with the internal combustion engine mounted thereon, effects or advantages can be brought about as will be described next.

(1) No additional sensor is needed to cope with rough roads, thereby making it possible to perform a lean operation without raising the cost.

(2) Even during running on a rough road, a lean operation can be performed, thereby making it possible to improve the gas mileage and also to reduce the emission of NOx.

The next method for the determination of a rough road in a vehicle with a multi-cylinder internal combustion engine mounted thereon is similar to the immediately described method and includes detecting an angular acceleration of a rotating shaft, which is driven by the internal combustion engine, in each specific stroke of each cylinder and calculating, on the basis of the results of the detection, variance data relevant to any revolution variance of each cylinder accompanied with a deterioration in combustion during operation of said internal combustion engine at an air/fuel ratio leaner than a stoichiometric air/fuel ratio, whereby said internal combustion engine being operated in the vicinity of a lean burn limit air/fuel ratio on the basis of the results of the calculation, but is characterized in that the vehicle with the internal combustion engine mounted thereon is determined or estimated to be running on a rough road based on indication of deteriorations in combustion by said variance data in plural cylinders, respectively, during the operation of said internal combustion engine in the vicinity of the lean burn limit air/fuel ratio.

In this method for the determination of a rough road in the vehicle with the multi-cylinder internal combustion engine mounted thereon, in addition to the procedures of the initially described method, an angular acceleration of the rotating shaft, which is driven by the internal combustion engine, in each specific stroke of each cylinder is detected and on the basis of the results of the detection, variance data relevant to any revolution variance of each cylinder accompanied with a deterioration in combustion during operation of the internal combustion engine at an air/fuel ratio leaner than a stoichiometric air/fuel ratio is calculated, whereby the internal combustion engine is operated in the vicinity of a lean burn limit air/fuel ratio on the basis of the results of the calculation. Based on indication of deteriorations in combustion by the variance data in plural cylinders, respectively, during the operation of the internal combustion engine in the vicinity of the lean burn limit air/fuel ratio, the vehicle with the internal combustion engine mounted thereon is determined or estimated to be running on a rough road.

According to this method for the determination of a rough road in the vehicle with the internal combustion engine mounted thereon, effects or advantages can be brought about as will be described next.

(1) No additional sensor is needed to cope with rough roads, thereby making it possible to perform a lean operation without raising the cost.

(2) Even during running on a rough road, a lean operation can be performed, thereby making it possible to improve the gas mileage and also to reduce the emission of NOx.

Another method for the determination of a rough road in a vehicle with an internal combustion engine mounted thereon is similar to the previously-described method, but is characterized in that when the revolution variance has taken a value on a deteriorated combustion side of a combustion state determining threshold at least as many times as a predetermined count during a predetermined period spanning over plural ignition strokes, the variance data are calculated as revolution variance states indicating deteriorations in combustion, respectively.

In this method for the determination of a rough road in the vehicle with the internal combustion engine mounted thereon, in addition to the procedures of the previously-described method, the variance data are calculated as revolution variance states indicating deteriorations in combustion, respectively, when the revolution variance has taken a value on a deteriorated combustion side of a combustion state determining threshold at least as many times as a predetermined count during a predetermined period spanning over plural ignition strokes.

According to this method for the determination of a rough road in the vehicle with the internal combustion engine mounted thereon, effects or advantages can be brought about as will be described next.

(1) No additional sensor is needed to cope with rough roads, thereby making it possible to perform a lean operation without raising the cost.

(2) Even during running on a rough road, a lean operation can be performed, thereby making it possible to improve the gas mileage and also to reduce the emission of NOx.

Yet another method for the determination of a rough road in a vehicle with an internal combustion engine mounted thereon is similar to the immediately previously-described method, but is characterized in that the vehicle is determined or estimated to be running on a rough road when, as minimal conditions, the variance data have indicated deteriorations in combustion and an average of the variance data on the deteriorated combustion side of the combustion state determining threshold has fallen on a deteriorated combustion side of a second combustion state determining threshold.

In this method for the determination of a rough road in the vehicle with the internal combustion engine mounted thereon, in addition to the procedures of the immediately previously-described method, the vehicle is determined or estimated to be running on a rough road when, as minimal conditions, the variance data have indicated deteriorations in combustion and an average of the variance data on the deteriorated combustion side of the combustion state determining threshold has fallen on a deteriorated combustion side of a second combustion state determining threshold.

According to this method for the determination of a rough road in the vehicle with the internal combustion engine mounted thereon, effects or advantages can be brought about as will be described next.

(1) Change to an anti-rough-road mode can be performed appropriately.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

A further method for the determination of a rough road in a vehicle with an internal combustion engine mounted thereon is similar to the method as described above, but is characterized in that during the operation of the internal combustion engine in the vicinity of the lean burn limit air/fuel ratio, the vehicle with the internal combustion engine mounted thereon is estimated to be running on a rough road on the basis of indication of deteriorations in combustion in plural cylinders by the variance data; and that the internal combustion engine is then operated at a testing air/fuel ratio richer than the air/fuel ratio in the vicinity of the lean burn limit, and the vehicle is determined to be running on a rough road on the basis of revolution variances detected during the operation.

In this method for the determination of a rough road in the vehicle with the internal combustion engine mounted thereon, in addition to the procedures of the method described above, the vehicle with the internal combustion engine mounted thereon is estimated to be running on a rough road on the basis of indication of deteriorations in combustion in plural cylinders by the variance data during the operation of the internal combustion engine in the vicinity of the lean burn limit air/fuel ratio. The internal combustion engine is then operated at a testing air/fuel ratio richer than said air/fuel ratio in the vicinity of the lean burn limit, and the vehicle is determined to be running on a rough road on the basis of revolution variances detected during the operation.

According to this method for the determination of a rough road in the vehicle with the internal combustion engine mounted thereon, effects or advantages can be brought about as will be described next.

(1) Determination of running on a rough road can be conducted surely, so that a revolution variance due to a deterioration in combustion and a revolution variance due to running on a rough road can be distinguished from each other without failure.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

A further method for the determination of a rough road in a vehicle with an internal combustion engine mounted thereon is similar to the immediately previously-described method, but is characterized in that the variance data are calculated under the operation at said testing air/fuel ratio, and said revolution variances during said operation are detected based on the variance data.

In this method for the determination of a rough road in the vehicle with the internal combustion engine mounted thereon, in addition to the procedures of the immediately previously-described method, the variance data are calculated under the operation at the testing air/fuel ratio and the revolution variances during the operation are detected based on the variance data.

According to this method for the determination of a rough road in the vehicle with the internal combustion engine mounted thereon, effects or advantages can be brought about as will be described next.

(1) Determination of running on a rough road can be conducted surely, so that a revolution variance due to a deterioration in combustion and a revolution variance due to running on a rough road can be distinguished from each other without failure.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

An additional method for the determination of a rough road in a vehicle with an internal combustion engine mounted thereon is similar to the immediately previously-described method, but is characterized in that the vehicle is determined to be running on a rough road when the variance data on plural cylinders under the operation at said testing air/fuel ratio show revolution variances.

In this method for the determination of a rough road in the vehicle with the internal combustion engine mounted thereon, in addition to the procedures of the immediately previously-described method, the vehicle is determined to be running on a rough road when the variance data on plural cylinders under the operation at the testing air/fuel ratio show revolution variances.

According to this method for the determination of a rough road in the vehicle with the internal combustion engine mounted thereon, effects or advantages can be brought about as will be described next.

(1) Determination of running on a rough road can be conducted surely, so that a revolution variance due to a deterioration in combustion and a revolution variance due to running on a rough road can be distinguished from each other without failure.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

A further method for the determination of a rough road in a vehicle with an internal combustion engine mounted thereon is similar to the method as described in any one of three immediately previously-described methods, but is characterized in that when the vehicle has been determined to be running on a rough road, the internal combustion engine is operated at a rough-road lean air/fuel ratio leaner than the testing air/fuel ratio, and that upon detection of a convergence state of revolution variances in the operation, the running on the rough road is determined to have ended.

In this method for the determination of a rough road in the vehicle with the internal combustion engine mounted thereon, in addition to the procedures of the method described in any one of three immediately previously-described methods, the internal combustion engine is operated at a rough-road lean air/fuel ratio leaner than the testing air/fuel ratio when the vehicle has been determined to be running on a rough road, and upon detection of a convergence state of revolution variances in the operation, the running on the rough road is determined to have ended.

According to this method for the determination of a rough road in the vehicle with the internal combustion engine mounted thereon, effects or advantages can be brought about as will be described next.

(1) Determination of running on a rough road can be conducted surely, so that a revolution variance due to a deterioration in combustion and a revolution variance due to running on a rough road can be distinguished from each other without failure.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

Another method for the determination of a rough road in a vehicle with an internal combustion engine mounted thereon is similar to the immediately previously-described method, but is characterized in that the variance data are calculated under operation at the rough-road lean air/fuel ratio and the convergence state of said revolution variances in said operation is detected based on the variance data.

In this method for the determination of a rough road in the vehicle with the internal combustion engine mounted thereon, in addition to the procedures of the immediately previously-described method, the variance data are calculated under operation at the rough-road lean air/fuel ratio and the convergence state of the revolution variances in the operation is detected based on the variance data.

According to this method for the determination of a rough road in the vehicle with the internal combustion engine mounted thereon, effects or advantages can be brought about as will be described next.

(1) Determination of running on a rough road can be conducted surely, so that a revolution variance due to a deterioration in combustion and a revolution variance due to running on a rough road can be distinguished from each other without failure.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

The next method for the determination of a rough road in a vehicle with an internal combustion engine mounted thereon is similar to the immediately previously-described method, but is characterized in that based on detection of no deterioration in combustion in the plural cylinders by the variance data, the convergence state of the revolution variances is detected.

In the method for the determination of a rough road in the vehicle with the internal combustion engine mounted thereon, in addition to the procedures of the immediately previously-described method, based on detection of no deterioration in combustion in the plural cylinders by the variance data, the convergence state of the revolution variances is detected.

According to this method for the determination of a rough road in the vehicle with the internal combustion engine mounted thereon, effects or advantages can be brought about as will be described next.

(1) Determination of running on a rough road can be conducted surely, so that a revolution variance due to a deterioration in combustion and a revolution variance due to running on a rough road can be distinguished from each other without failure.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

An additional method for the determination of a rough road in a vehicle with a multi-cylinder internal combustion engine mounted thereon is similar to the initially described method and includes detecting an angular acceleration of a rotating shaft, which is driven by the multi-cylinder internal combustion engine, in each specific stroke of each cylinder, calculating, on the basis of the results of the detection, variance data relevant to any revolution variance of each cylinder accompanied with a deterioration in combustion during operation of the internal combustion engine at an air/fuel ratio leaner than a stoichiometric air/fuel ratio, determining based on the variance data of each cylinder whether the combustion therein is good or not, and detecting with respect to each cylinder air/fuel ratio changing data required to slightly change the air/fuel ratio for the internal combustion engine, which is under operation in the vicinity of a lean burn limit air/fuel ratio, toward a leaner side when the combustion is good or toward a richer side when the combustion is not good, whereby the internal combustion engine is operated in the vicinity of the lean burn limit air/fuel ratio on the basis of the results of said detection, but is characterized in that the vehicle with the internal combustion engine mounted thereon is determined or estimated to be running on a rough road when, as minimal conditions, the variance data indicating deteriorations in combustion in plural cylinders have been detected during the operation of the internal combustion engine in the vicinity of the lean burn limit air/fuel ratio and the air/fuel ratio changing data in at least one of the cylinders during the operation of the internal combustion engine in the vicinity of the lean burn limit air/fuel ratio continuously motivate to change the air/fuel ratio to the richer side.

In this method for the determination of a rough road in the vehicle with the multi-cylinder internal combustion engine mounted thereon, in addition to the procedures of the initially described method, an angular acceleration of a rotating shaft, which is driven by the multi-cylinder internal combustion engine, is detected in each specific stroke of each cylinder, variance data relevant to any revolution variance of each cylinder accompanied with a deterioration in combustion during operation of the internal combustion engine at an air/fuel ratio leaner than a stoichiometric air/fuel ratio is calculated on the basis of the results of the detection, whether the combustion therein is good or not is determined based on the variance data of each cylinder, and with respect to each cylinder, air/fuel ratio changing data required to slightly change the air/fuel ratio for the internal combustion engine, which is under operation in the vicinity of a lean burn limit air/fuel ratio, toward a leaner side when the combustion is good or toward a richer side when the combustion is not good is determined, whereby the internal combustion engine is operated in the vicinity of the lean burn limit air/fuel ratio on the basis of the results of the detection. When as minimal conditions, the variance data indicating deteriorations in combustion in plural cylinders have been detected during the operation of the internal combustion engine in the vicinity of the lean burn limit air/fuel ratio and the air/fuel ratio changing data in at least one of the cylinders during the operation of the internal combustion engine in the vicinity of the lean burn limit air/fuel ratio continuously motivate to change the air/fuel ratio to the richer side, the vehicle with the internal combustion engine mounted thereon is determined or estimated to be running on a rough road.

According to this method for the determination of a rough road in the vehicle with the internal combustion engine mounted thereon, effects or advantages can be brought about as will be described next.

(1) Determination of running on a rough road can be conducted surely, so that a revolution variance due to a deterioration in combustion and a revolution variance due to running on a rough road can be distinguished from each other without failure.

(2) No additional sensor is needed to cope with rough roads, thereby making it possible to perform a lean operation without raising the cost.

(3) Even during running on a rough road, a lean operation can be performed, thereby making it possible to improve the gas mileage and also to reduce the emission of NOx.

(4) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(5) Owing to the effect or advantage in the preceding item, the emission of NOx can be minimized.

(6) The detection and control of revolution variance in each cylinder can be performed by a single crank angle sensor, thereby making it possible to perform surer lean-burn control and a stoichiometric operation at low cost.

A significant method for the determination of a rough road in a vehicle with an internal combustion engine mounted thereon is similar to the initially described method as and includes detecting revolution variances occurring when the internal combustion engine is operated at an air/fuel ratio leaner than a stoichiometric air/fuel ratio, obtaining, based on the results of the detection, combustion determining data in each predetermined sampling period to determine whether combustion is good or not, and setting air/fuel ratio changing data so that the air/fuel ratio for the internal combustion engine operated in the vicinity of a lean burn limit air/fuel ratio is slightly changed toward a leaner side when the combustion determining data indicate good combustion but the air/fuel ratio for the internal combustion engine operated in the vicinity of the lean burn limit air/fuel ratio is slightly changed toward a richer side when the combustion determining data indicates a deterioration in combustion, whereby the engine is operated in the vicinity of the lean burn limit air/fuel ratio on the basis of the air/fuel ratio changing data, but is characterized in that the vehicle is determined or estimated to running on a rough road when the results of a logical determination between the state of an increase or decrease in said combustion determining data and the state of an increase or decrease in the air/fuel ratio changing data on at least one cylinder of the internal combustion engine during the operation in the vicinity of the lean burn limit air/fuel ratio have indicated results corresponding to a rough-road-running state and other conditions for rough road running have been met with respect to plural ones of said cylinders.

In this method for the determination of a rough road in the vehicle with the internal combustion engine mounted thereon, in addition to the procedures of the initially described method, revolution variances occurred when the internal combustion engine is operated at an air/fuel ratio leaner than a stoichiometric air/fuel ratio are detected, combustion determining data in each predetermined sampling period are obtained based on the results of the detection to determine whether combustion is good or not, and air/fuel ratio changing data are set so that the air/fuel ratio for the internal combustion engine operated in the vicinity of a lean burn limit air/fuel ratio is slightly changed toward a leaner side when the combustion determining data indicate good combustion but the air/fuel ratio for the internal combustion engine operated in the vicinity of the lean burn limit air/fuel ratio is slightly changed toward a richer side, whereby the engine is operated in the vicinity of the lean burn limit air/fuel ratio on the basis of the air/fuel ratio changing data. In this operation, when the results of a logical determination between the state of an increase or decrease in the combustion determining data and the state of an increase or decrease in the air/fuel ratio changing data on at least one cylinder of the internal combustion engine during the operation in the vicinity of the lean burn limit air/fuel ratio have indicated results corresponding to a rough-road-running state and other conditions for rough road running have been met with respect to plural ones of the cylinders, the vehicle is determined or estimated to be running on a rough road.

According to this method for the determination of a rough road in the vehicle with the internal combustion engine mounted thereon, effects or advantages can be brought about as will be described next.

(1) No additional sensor is needed to cope with rough roads, thereby making it possible to perform a lean operation without raising the cost.

(2) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(3) Even on a rough road where detection is difficult, it is possible to prevent deteriorations in exhaust gas and drivability.

(4) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(5) Owing to the effect or advantage in the preceding item, the emission of NOx can be minimized.

(6) The detection and control of revolution variance in each cylinder can be performed by a single crank angle sensor, thereby making it possible to perform surer lean-burn control and a stoichiometric operation at low cost.

(7) No additional sensor is needed to cope with rough roads, thereby making it possible to perform a lean operation without raising the cost.

(8) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(9) Even on a rough road where detection is difficult, it is possible to prevent deteriorations in exhaust gas and drivability.

(10) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(11) Owing to the effect or advantage in the preceding item, the emission of NOx can be minimized.

(12) The detection and control of revolution variance in each cylinder can be performed by a single crank angle sensor, thereby making it possible to perform surer lean-burn control and a stoichiometric operation at low cost.

(13) No additional sensor is needed to cope with rough roads, thereby making it possible to perform a lean operation without raising the cost.

(14) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(15) Even on a rough road where detection is difficult, it is possible to prevent deteriorations in exhaust gas and drivability.

The next method for the determination of a rough road in a vehicle with an internal combustion engine mounted thereon is similar to the previously described significant method, but is characterized in that when one or both of a change of the combustion determining data to a deteriorated combustion side subsequent to a change of the air/fuel ratio changing data toward the richer air/fuel side and a change of the combustion determining data to a good combustion side subsequent to a change of the air/fuel ratio changing data toward the leaner air/fuel side have remained, the vehicle with the internal combustion engine is determined or estimated to be running on a rough road.

In this method for the determination of a rough road in the vehicle with the internal combustion engine mounted thereon, in addition to the procedures of the previously described significant method, said vehicle with the internal combustion engine is determined or estimated to be running on a rough road when one or both of a change of the combustion determining data to a deteriorated combustion side subsequent to a change of the air/fuel ratio changing data toward the richer air/fuel side and a change of the combustion determining data to a good combustion side subsequent to a change of the air/fuel ratio changing data toward the leaner air/fuel side have remained.

According to this method for the determination of a rough road in the vehicle with the internal combustion engine mounted thereon, effects or advantages can be brought about as will be described next.

(1) No additional sensor is needed to cope with rough roads, thereby making it possible to perform a lean operation without raising the cost.

(2) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(3) Even on a rough road where detection is difficult, it is possible to prevent deteriorations in exhaust gas and drivability.

A further method for the determination of a rough road in a vehicle with an internal combustion engine mounted thereon is similar to the previously described significant method, but is characterized in that rough road determining data are set so that the value of the rough road determining data increases at least when the combustion determining data have changed to the deteriorated combustion side subsequent to the change of the air/fuel ratio changing data toward the richer air/fuel side or when the combustion determining data have changed to the good combustion side subsequent to the change of the air/fuel ratio changing data toward the leaner air/fuel side and the value of the rough road determining data decreases at least when the combustion determining data have changed to the good combustion side subsequent to the change of the air/fuel ratio changing data toward the richer air/fuel side or when the combustion determining data have changed to the deteriorated combustion side subsequent to the change of the air/fuel ratio changing data toward the leaner air/fuel side; and that when the rough road determining data have become greater than a predetermined value, the vehicle is determined or estimated to be running on a rough road.

In this method for the determination of a rough road in the vehicle with the internal combustion engine mounted thereon, in addition to the procedures of the previously described significant method, the value of the rough road determining data increases at least when the combustion determining data have changed to the deteriorated combustion side subsequent to the change of the air/fuel ratio changing data toward the richer air/fuel side or when the combustion determining data have changed to the good combustion side subsequent to the change of the air/fuel ratio changing data toward the leaner air/fuel side. Further, the value of the rough road determining data is decreased at least when the combustion determining data have changed to the good combustion side subsequent to the change of the air/fuel ratio changing data toward the richer air/fuel side or when the combustion determining data have changed to the deteriorated combustion side subsequent to the change of the air/fuel ratio changing data toward the leaner air/fuel side. When the rough road determining data have become greater than a predetermined value, the vehicle is determined or estimated to be running on a rough road.

According to this method for the determination of a rough road in the vehicle with the internal combustion engine mounted thereon, effects or advantages can be brought about as will be described next.

(1) No additional sensor is needed to cope with rough roads, thereby making it possible to perform a lean operation without raising the cost.

(2) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(3) Even on a rough road where detection is difficult, it is possible to prevent deteriorations in exhaust gas and drivability.

The next method for the determination of a rough road in a vehicle with an internal combustion engine mounted thereon is similar to the previously described significant method, but is characterized in that the method comprises detecting an angular acceleration of a rotating shaft, which is driven by the internal combustion engine, in each specific stroke of each cylinder, and calculating, on the basis of the results of the detection, the combustion determining data.

In this method for the determination of a rough road in the vehicle with the internal combustion engine mounted thereon, in addition to the procedures of the previously described significant method, an angular acceleration of the rotating shaft, which is driven by the internal combustion engine, is detected in each specific stroke of each cylinder and on the basis of the results of the detection, the combustion determining data are calculated.

According to this method for the determination of a rough road in the vehicle with the internal combustion engine mounted thereon, effects or advantages can be brought about as will be described next.

(1) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(2) Owing to the effect or advantage in the preceding item, the emission of NOx can be minimized.

(3) The detection and control of revolution variance in each cylinder can be performed by a single crank angle sensor, thereby making it possible to perform surer lean-burn control and a stoichiometric operation at low cost.

(4) No additional sensor is needed to cope with rough roads, thereby making it possible to perform a lean operation without raising the cost.

(5) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(6) Even on a rough road where detection is difficult, it is possible to prevent deteriorations in exhaust gas and drivability.

Another method for the determination of a rough road in a vehicle with an internal combustion engine mounted thereon is similar to the previously described significant method, but is characterized in that the internal combustion engine is provided with plural cylinders, the method comprises detecting an angular acceleration of a rotating shaft, which is driven by the internal combustion engine, in each specific stroke, determining, based on the results of the detection, combustion state indicating data every combustion of each cylinder, the combustion state indicating data corresponding to whether combustion is good or not, calculating the combustion determining data with respect to each cylinder on the basis of the combustion state indicating data in a predetermined sampling period, and setting the air/fuel ratio changing data from the combustion determining data with respect to each cylinder, and that when the results of a logical determination between the state of an increase or decrease in the combustion determining data and the state of an increase or decrease in the air/fuel ratio changing data on at least one of the cylinders have indicated results corresponding to a rough-road-running state and the combustion state indicating data on plural ones of the cylinders have indicated a rough-road-running state, the vehicle is determined to be running on a rough road.

In this method for the determination of a rough road in the vehicle with the internal combustion engine mounted thereon, in addition to the procedures of the previously described significant method, an angular acceleration of a rotating shaft which is driven by the internal combustion engine is detected in each specific stroke in the internal combustion engine provided with the plural cylinders, and based on the results of the detection, combustion state indicating data corresponding to whether combustion is good or not are determined every combustion of each cylinder. The combustion determining data are then calculated with respect to each cylinder on the basis of the combustion state indicating data in a predetermined sampling period, and the air/fuel ratio changing data are set from the combustion determining data with respect to each cylinder, and when the results of a logical determination between the state of an increase or decrease in the combustion determining data and the state of an increase or decrease in the air/fuel ratio changing data on at least one cylinder have indicated results corresponding to a rough-road-running state and the combustion state indicating data on plural cylinders have indicated a rough-road-running state, the vehicle is determined to be running on a rough road.

According to this method for the determination of a rough road in the vehicle with the internal combustion engine mounted thereon, effects or advantages can be brought about as will be described next.

(1) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(2) owing to the effect or advantage in the preceding item, the emission of NOx can be minimized.

(3) The detection and control of revolution variance in each cylinder can be performed by a single crank angle sensor, thereby making it possible to perform surer lean-burn control and a stoichiometric operation at low cost.

(4) No additional sensor is needed to cope with rough roads, thereby making it possible to perform a lean operation without raising the cost.

(5) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(6) Even on a rough road where detection is difficult, it is possible to prevent deteriorations in exhaust gas and drivability.

An additional method for the determination of a rough road in a vehicle with an internal combustion engine mounted thereon is similar to the previously described significant method, but is characterized in that based on indication of the results corresponding to the rough-road-running state by the results of the logical determination between the state of the increase or decrease in the combustion determining data and the state of the increase or decrease in the air/fuel ratio changing data and also on departure of the combustion state indicating data from a predetermined range set by an upper value and a lower value, the vehicle is determined to be running on a rough road.

In this method for the determination of a rough road in the vehicle with the multi-cylinder internal combustion engine mounted thereon, in addition to the procedures of the previously described significant method, the vehicle is determined to be running on a rough road based on indication of the results corresponding to the rough-road-running state by the results of the logical determination between the state of the increase or decrease in the combustion determining data and the state of the increase or decrease in the air/fuel ratio changing data and also on departure of the combustion state indicating data from a predetermined range set by an upper value and a lower value.

According to this method for the determination of a rough road in the vehicle with the internal combustion engine mounted thereon, effects or advantages can be brought about as will be described next.

(1) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(2) Owing to the effect or advantage in the preceding item, the emission of NOx can be minimized.

(3) The detection and control of revolution variance in each cylinder can be performed by a single crank angle sensor, thereby making it possible to perform surer lean-burn control and a stoichiometric operation at low cost.

(4) No additional sensor is needed to cope with rough roads, thereby making it possible to perform a lean operation without raising the cost.

(5) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(6) Even on a rough road where detection is difficult, it is possible to prevent deteriorations in exhaust gas and drivability.

A penultimate method for the determination of a rough road in a vehicle with an internal combustion engine mounted thereon is similar to the immediately preceding described method, but is characterized in that based on indication of the results corresponding to the rough-road-running state by the results of the logical determination between the state of the increase or decrease in the combustion determining data and the state of the increase or decrease in the air/fuel ratio changing data and also on production of a state greater than the upper value by the combustion state indicating data at least as many times as a predetermined first count and production of a state smaller than the lower value by the combustion state indicating data at least as many times as a predetermined second count, both, in the predetermined sampling period, the vehicle is determined to be running on a rough road.

In this method for the determination of a rough road in the vehicle with the internal combustion engine mounted thereon, in addition to the procedures of the immediately preceding described method, the vehicle is determined to be running on a rough road based on indication of the results corresponding to the rough-road-running state by the-results of the logical determination between the state of the increase or decrease in the combustion determining data and the state of the increase or decrease in the air/fuel ratio changing data and also on production of a state greater than the upper value by the combustion state indicating data at least as many times as a predetermined first count and production of a state smaller than the lower value by the combustion state indicating data at least as many times as a predetermined second count, both, in the predetermined sampling period.

According to this method or the determination of a rough road in the vehicle with the internal combustion engine mounted thereon, effects or advantages can be brought about as will be described next.

(1) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(2) Owing to the effect or advantage in the preceding item, the emission of NOx can be minimized.

(3) The detection and control of revolution variance in each cylinder can be performed by a single crank angle sensor, thereby making it possible to perform surer lean-burn control and a stoichiometric operation at low cost.

(4) No additional sensor is needed to cope with rough roads, thereby making it possible to perform a lean operation without raising the cost.

(5) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(6) Even on a rough road where detection is difficult, it is possible to prevent deteriorations in exhaust gas and drivability.

A final method for the determination of a rough road in a vehicle with a multi-cylinder internal combustion engine mounted thereon includes detecting a revolution variance with respect to each cylinder and determining the occurrence or non-occurrence of a misfire in each cylinder based on detection of a revolution variance state indicating a deterioration in combustion, but is characterized in that when revolution variance states indicating deteriorations in combustion have been detected in plural cylinders, respectively, the vehicle with the internal combustion engine mounted thereon is determined or estimated to be running on a rough road.

According to this method for the determination of a rough road in the vehicle with the multi-cylinder internal combustion engine mounted thereon, a revolution variance is detected with respect to each cylinder and based on detection of a revolution variance state indicating a deterioration in combustion, the occurrence or non-occurrence of a misfire in each cylinder is determined. When revolution variance states indicating deteriorations in combustion have been detected in plural cylinders, respectively, the vehicle with the internal combustion engine mounted thereon is determined or estimated to be running on a rough road.

According to this method for the determination of a rough road in the vehicle with the internal combustion engine mounted thereon, effects or advantages can be brought about as will be described next.

(1) No additional sensor is needed to cope with rough roads, thereby making it possible to perform a lean operation without raising the cost.

(2) Even during running on a rough road, a lean operation can be performed, thereby making it possible to improve the gas mileage and also to reduce the emission of NOx.

BEST MODE FOR CARRYING OUT THE INVENTION

The embodiments of the present invention will hereinafter be described with reference to the drawings.

(a) Description of the first embodiment

Figure 1:
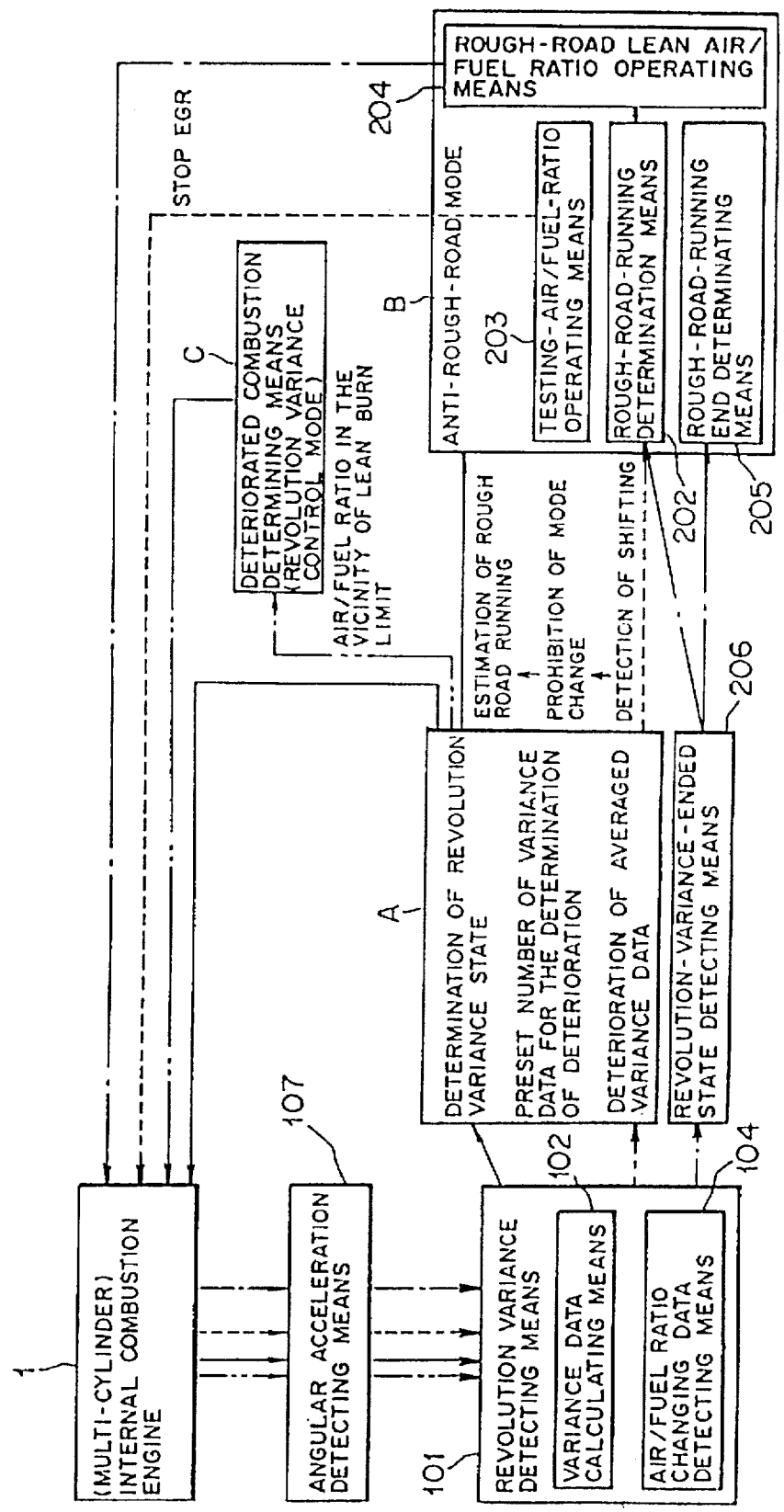
FIG. 1 is a control block diagram of a system for practicing a method according to a first embodiment of the present invention for the determination of a rough road in a vehicle with an internal combustion engine mounted thereon.
Figure 2:
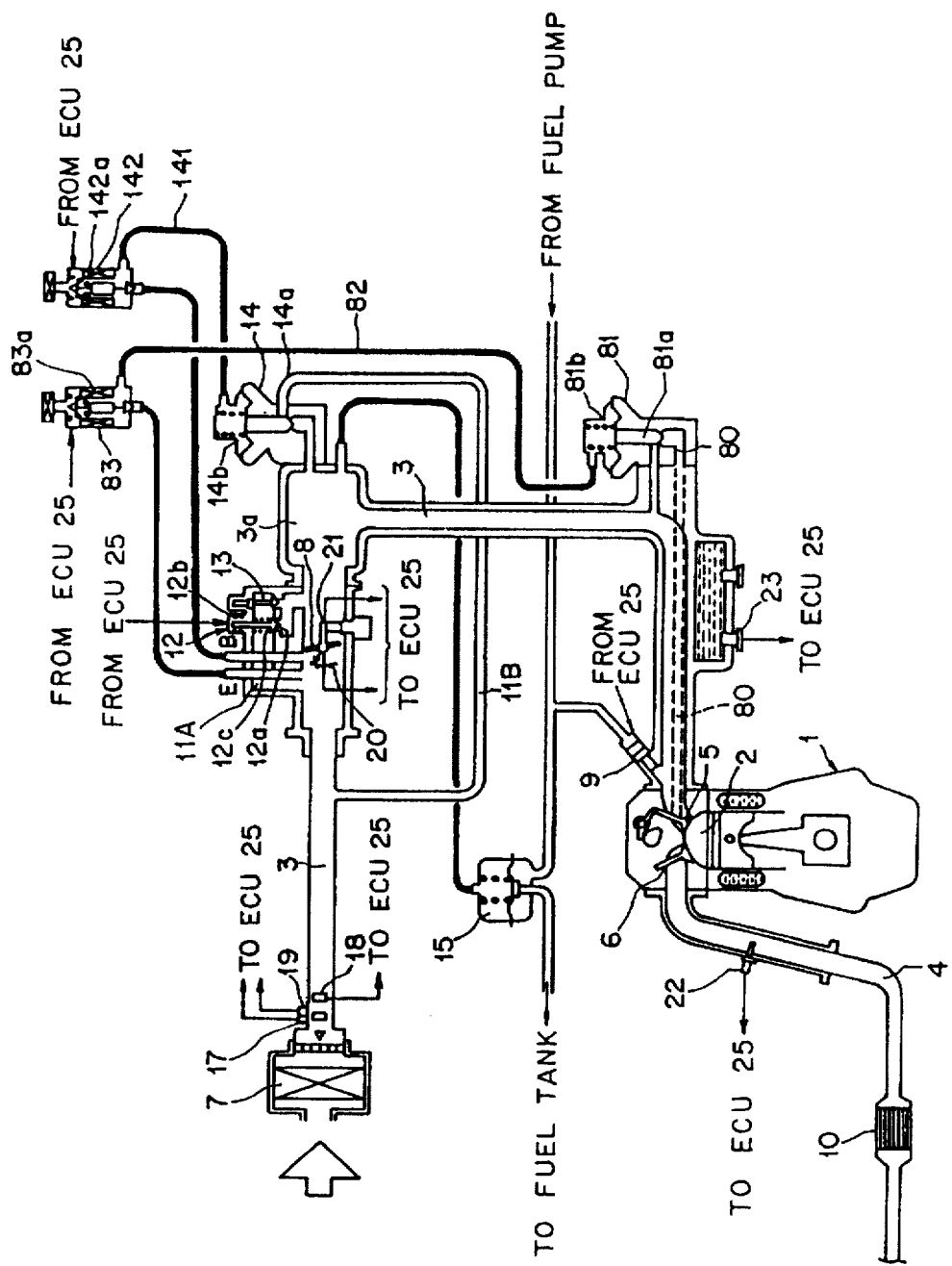
FIG. 2 is an overall construction diagram of an engine system equipped with the system of FIG. 1.

An engine for an automotive vehicle, the engine being equipped with the present control system, is constructed as a lean-burn engine which performs a lean-burn operation at an air/fuel ratio leaner than a stoichiometric air/fuel ratio under predetermined operation conditions. This engine may be illustrated as shown in FIG. 2. In FIG. 2, the (internal combustion) engine 1 has an intake passage 3 and an exhaust passage 4, both of which are communicated to a combustion chamber 2. The communication between the intake passage 3 and the combustion chamber 2 is controlled by an intake valve 5, while the communication between the exhaust passage 4 and the combustion chamber 2 is controlled by an exhaust valve 6.

The intake passage 3 is provided with an air cleaner 7, a throttle valve 8 and as fuel feeding means, an electromagnetic fuel injection valve (injector) 9, which are arranged successively from an upstream side of the intake passage 3. The exhaust passage 4, on the other hand, is provided with a three-way catalyst 10 and an unillustrated muffler (noise eliminator) successively from an upstream side of the exhaust passage 4. Incidentally, each cylinder of the engine 1 is provided with its own injector 9. Further, the exhaust passage 3 is provided with a surge tank 3a.

The three-way catalyst 10 is to eliminate CO, HC and NOx while the engine is operated at the stoichiometric air/fuel ratio, and is of a known construction.

The throttle valve 8 is connected to an accelerator pedal (not shown) via a wire cable so that the position of the throttle valve 8 is regulated according to the stroke of the accelerator pedal.

The intake passage 3 is provided with a first bypass passage 11A which extends bypassing the throttle valve 8. Inserted in this bypass passage 11A is a stepper motor valve (hereinafter called the "STM valve") 12 which functions as an ISC (idling speed control) valve. In the first bypass passage 11A, a first idling air valve 13 of the wax type whose opening is regulated according to the temperature of an engine coolant is also arranged in a side-by-side relationship with the STM valve 12.

The STM valve 12 is constructed of a valve element 12a which can be brought into contact with a valve seat portion formed in the first bypass passage 11A, a stepper motor (ISC actuator) 12b for controlling the position of the valve element, and a spring 12c normally biasing the valve element against the valve seat portion (i.e., in the direction that the first bypass passage 11A is closed by the valve element).

By adjusting the position of the valve element 12a stepwise (according to the number of steps) relative to the valve seat portion by the stepper motor 12b, the opening between the valve seat portion and the valve element 12a, that is, the position of the STM valve 12 can be controlled.

By controlling the position of the STM valve 12 in accordance with an electronic control unit (ECU) 25 as a controller, which will be described subsequently herein, intake air can be fed to the engine 1 through the first bypass passage 11A irrespective of operation of the accelerator pedal by the driver. By changing the position of the STM valve 12, the quantity of air to be inducted through the throttle bypass passage 11A can be controlled.

As an ISC actuator, a DC motor can also be used instead of the stepper motor 12b.

The intake passage 3 is additionally provided with a second bypass passage 11B which also extends bypassing the throttle valve 8. An air bypass valve 14 is inserted in the second bypass passage 11B.

The air bypass valve 14 is constructed of a valve element 14a which can be brought into contact with a valve seat portion formed in the second bypass passage 11b and a diaphragm-type actuator 14b for controlling the position of the valve element 14a. A diaphragm compartment of the diaphragm-type actuator 14b is provided with a pilot passage 141 which is in communication with the intake passage on a side downstream the throttle valve. An air-bypass-valve-controlling electromagnetic valve 142 is inserted in the pilot passage 141.

By controlling the position of the air-bypass-valve-controlling electromagnetic valve 142 with ECU 25 which will be described subsequently herein, it is also possible to supply intake air into the engine 1 through the second bypass passage 11B irrespective of an operation of the accelerator pedal by the driver. Further, the quantity of air to be inducted while bypassing the throttle valve can be controlled by changing the position of the air-bypass-valve-controlling electromagnetic valve 142. Incidentally, it is the basic mode of operation of the air-bypass-valve-controlling electromagnetic valve 142 that it is open in a lean-burn operation but is otherwise kept closed.

Between the exhaust passage 4 and the intake passage 3, an exhaust gas recirculation passage (EGR passage) 80 is inserted to return exhaust gas to the intake system. An EGR valve 81 is inserted in the EGR passage 80.

The EGR valve 81 is constructed of a valve element 81a which can be brought into contact with a valve seat portion formed in the EGR passage 80 and a diaphragm-type actuator 81b for controlling the position of the valve element 81a. A diaphragm compartment of the diaphragm-type actuator 81b is provided with a pilot passage 82 which is in communication with the intake passage on a side downstream the throttle valve. An ERG-valve-controlling electromagnetic valve 83 is inserted in the pilot passage 82.

By controlling the position of the EGR-valve-controlling electromagnetic valve 83 with ECU 25 which will be described subsequently herein, exhaust gas can be returned to the intake system through the EGR passage 80.

In FIG. 2, numeral 15 indicates a fuel pressure regulator. This fuel pressure regulator 15 is actuated responsive to a negative pressure in the intake passage 3 to control the quantity of fuel to be returned from an unillustrated fuel pump to an unillustrated fuel tank, so that the pressure of fuel to be injected from the injector 9 can be controlled.

To control the engine system, various sensors are arranged. First, as is shown in FIG. 2, a portion where intake air flowed past the air cleaner 7 flows into the intake passage 3 is provided with an air flow sensor (inducted air quantity sensor) 17 for detecting the quantity of the inducted air from Karman vortex information, an intake air temperature sensor 18 for detecting the temperature of air to be inducted to the engine 1, and an atmospheric pressure sensor 19 for detecting the atmospheric pressure.

At the position of arrangement of the throttle valve 8 in the intake passage 3, there are arranged a throttle position sensor 20 in the form of a potentiometer for detecting the position of the throttle valve 8 as well as an idling switch 21.

On the side of the exhaust passage 4, on the other hand, an oxygen concentration sensor (hereinafter referred to simply as the "$O_2$ sensor") 22 for detecting the concentration of oxygen ($O_2$ concentration) in the exhaust gas is disposed. Other sensors include a coolant temperature sensor 23 for detecting the temperature of coolant of the engine 1, a crank angle sensor 24 (see FIG. 3) for detecting a crank angle (which can also function as a speed sensor for detecting an engine speed Ne), a vehicle speed sensor 30, etc.

Figure 3:
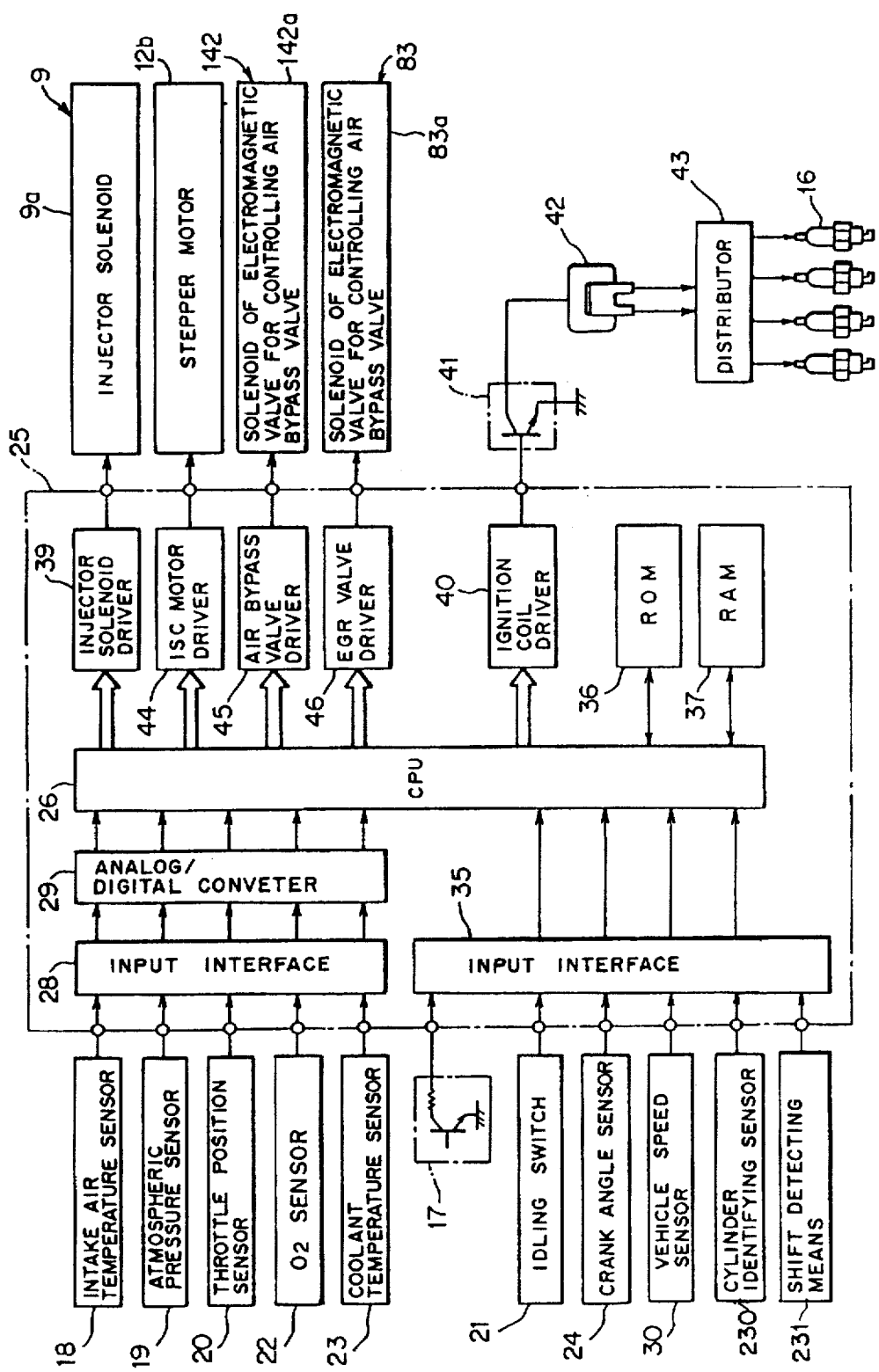
FIG. 3 is a hardware block diagram showing a control system of the engine system equipped with the system of FIG. 1, FIGS. 4 through 7 are flow charts for explaining operations of the system of FIG. 1, respectively.

Detection signals from these sensors and switch are inputted to ECU 25 as shown in FIG. 3.

Further, shift detecting means 231 is arranged so that its detection signal is inputted to ECU 25. The shift detecting means 231 is designed to provide a detection signal by detecting a change in speed stage on the basis of ELC communication from a shift control computer.

The hardware construction of ECU 25 can be illustrated as shown in FIG. 3. ECU 25 is constructed as a computer which is provided as a principal component thereof with CPU (processor) 26. To CPU 26, detection signals from the intake air temperature sensor 18, the atmospheric pressure sensor 19, the throttle position sensor 20, the $O_2$ sensor 22, the coolant temperature sensor 23 and the like are inputted via an input interface 28 and an A/D converter 29.

Directly inputted through an input interface 35 to CPU 26 are detection signals from the air flow sensor 17, the idling switch 21, the crank angle sensor 24, the vehicle speed sensor 30, a cylinder-identifying sensor 230, the shift detecting means 231 and the like.

Through a bus line, CPU 26 also exchanges data with ROM (memory means) 36, in which various data are stored along with program data and fixed value data, and also with RAM 37 which is updated, that is, successively rewritten.

As a result of computation by CPU 26, ECU 25 outputs signals for controlling the state of operation of the engine 1, for example, various control signals such as a fuel injection control signal, an ignition timing control signal, an ISC control signal, a bypass air control signal and an EGR control signal.

Here, the fuel injection control (air/fuel ratio control) signal is outputted from CPU 26 to an injector solenoid 9a (precisely, a transistor for the injector solenoid 9a), which is arranged to drive the injector 9, via an injector solenoid driver 39. The ignition timing control signal is outputted from CPU 26 to a power transistor 41 via an ignition coil driver 40, so that a current is supplied from the power transistor 41 via an ignition coil 42 to a distributor 43 to make individual spark plugs 16 successively produce sparks.

The ISC control signal is outputted from CPU 26 to the stepper motor 12b via an ISC driver 44, while the bypass air control signal is outputted from CPU 26 to the solenoid 142a of the air-bypass-valve-controlling electromagnetic valve 142 via an air bypass valve driver 45.

Further, the EGR control signal is outputted from CPU 26 to the solenoid 83a of the EGR-valve-controlling electromagnetic valve 83 via the EGR driver 46.

Now paying attention to fuel injection control (air/fuel ratio control), for this fuel injection control (control of an injector drive time), ECU 25 is provided with functions of revolution variance detecting means 101, variance value calculating means 102, air/fuel ratio changing data detecting means 104, angular acceleration detecting means 107, rough-road-running determination means 202, testing-air/fuel-ratio operating means 203, rough-road-running lean air/fuel ratio operating means 204, rough-road-running end determining means 205, and revolution variance detecting means 206.

Figure 5:
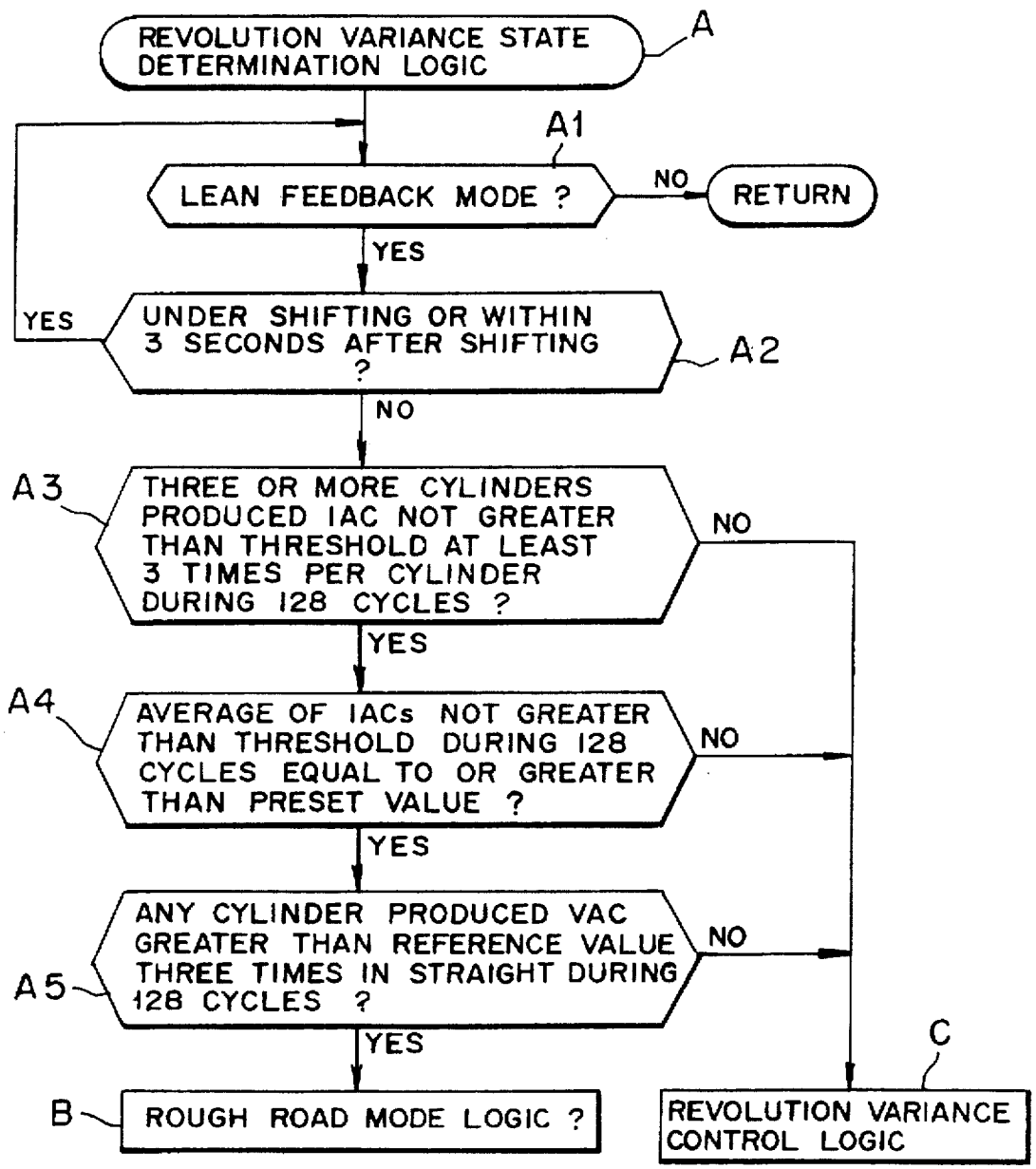
Figure 6:
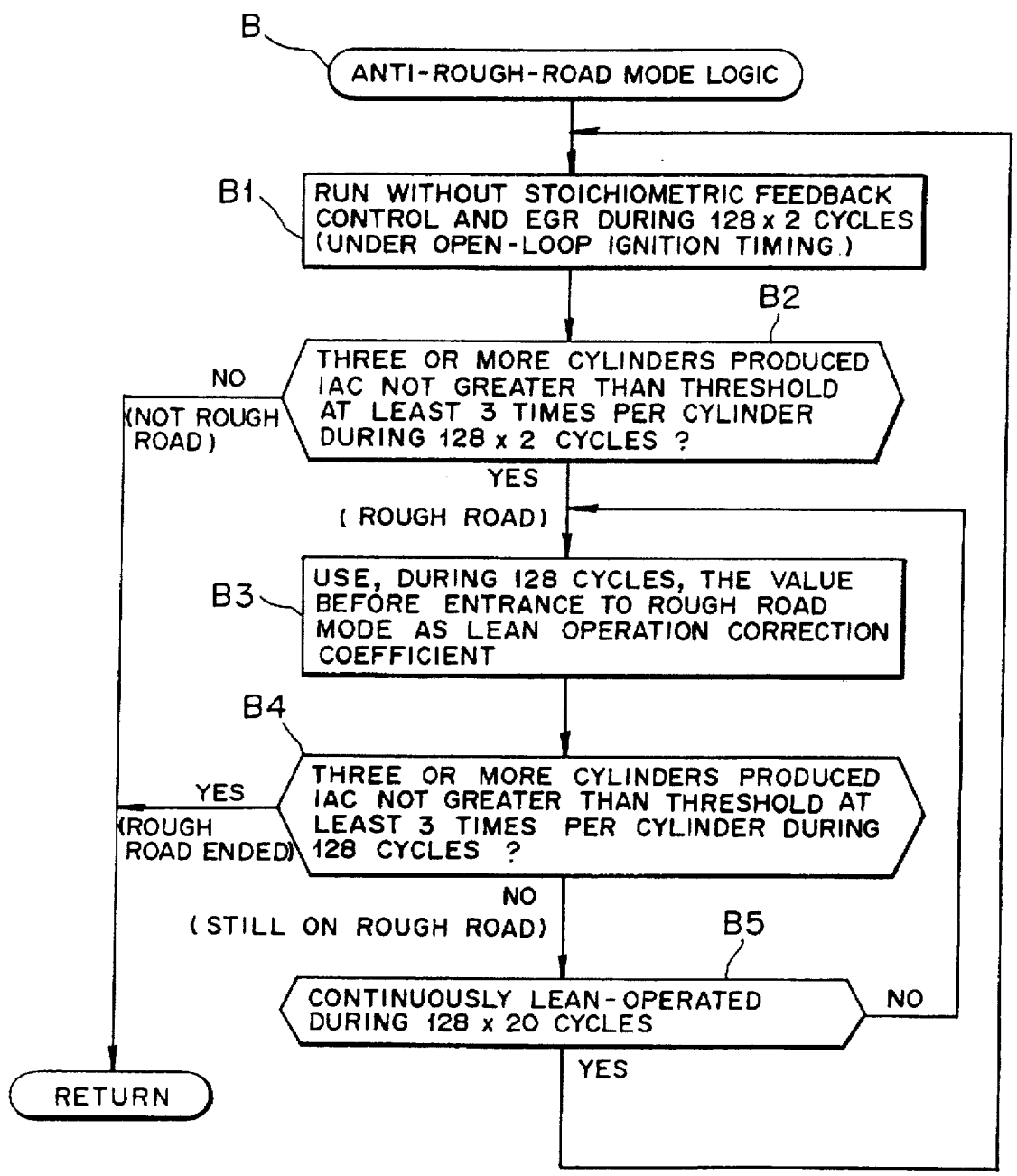
Figure 7:
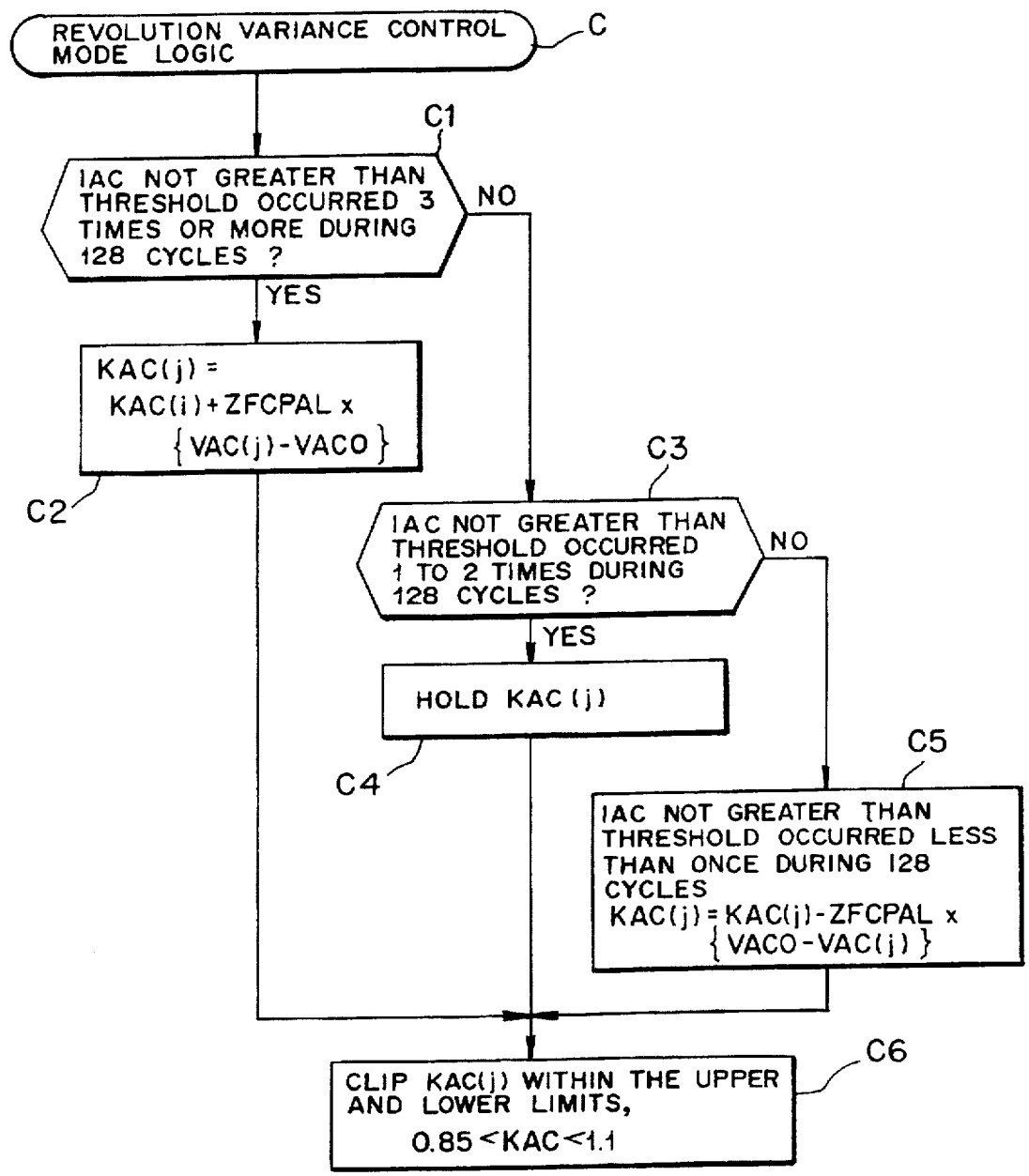

In addition, ECU 25 is also provided with a revolution variance state determining logic A which performs an operation in accordance with the flow chart of FIG. 5, an anti-rough-road mode logic B for performing an operation in accordance with the flow chart of FIG. 6 and a revolution variance control mode logic C for performing an operation in accordance with the flow chart of FIG. 7.

Further, ECU 25 is equipped with functions of combustion state control means, a combustion variance adjusting element, smoothing means, threshold updating means and misfire-determining reference values although they are omitted in the diagram.

Here, the combustion variance adjusting element is to adjust a fuel injection pulse width Tinj to a desired state by a control signal from the combustion state controlling means so that a lean-burn operation is performed at an air/fuel ratio which is supposed to be achieved. The injector 9 functions as the combustion variance adjusting element.

Incidentally, the fuel injection pulse width Tinj is expressed by the following formula:

$$Tinj(j)=TB \cdot KAC(j) \cdot K \cdot KAFL+Td \qquad (1\text{-}1)$$

TB in the above formula means a basic drive time of the injector 9. From information on an inducted air quantity A from the air flow sensor 17 and information on an engine speed N from the crank angle sensor (engine speed sensor) 24, information on an inducted air quantity A/N per engine revolution is obtained and based on this information, the basic drive time TB is determined.

On the other hand, KAFL is a leaning correction coefficient and from characteristics stored in a map, is determined corresponding to an operation state of the engine. The air/fuel ratio can therefore be made lean or stoichiometric depending on the operation state.

KAC(j) is, as will be described subsequently herein, a correction coefficient for performing combustion state control in correspondence to variance in combustion.

Further, the correction coefficient K is set in accordance with the engine coolant temperature, the inducted air temperature, the atmospheric pressure and the like. By the dead time (invalid time) Td, the drive time is corrected according to the battery voltage.

It is also designed to perform a lean-burn operation when predetermined conditions are found to be met by lean operation condition determining means.

Accordingly, ECU 25 has the function of air/fuel ratio controlling means which controls the air/fuel ratio to have an air/fuel ratio on a side leaner than a stoichiometric air/fuel ratio under predetermined operation conditions.

Incidentally, this combustion state controlling system is equipped with the angular acceleration detecting means 107 which detects an angular acceleration of the rotating shaft (crankshaft) driven by the engine. Said angular acceleration detecting means 107 is constructed as will be described next.

Figure 13:
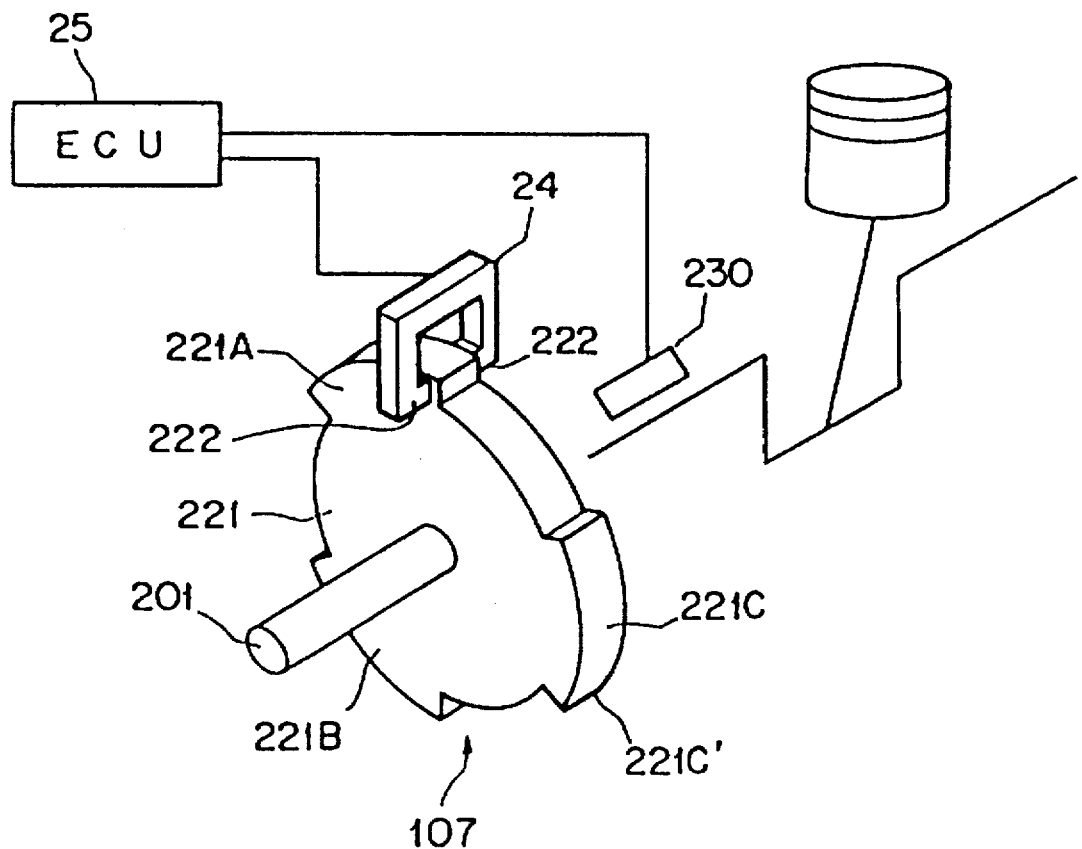
FIG. 13 is a schematic perspective view showing a revolution variance detecting portion in the system of FIG. 1.
Figure 14:
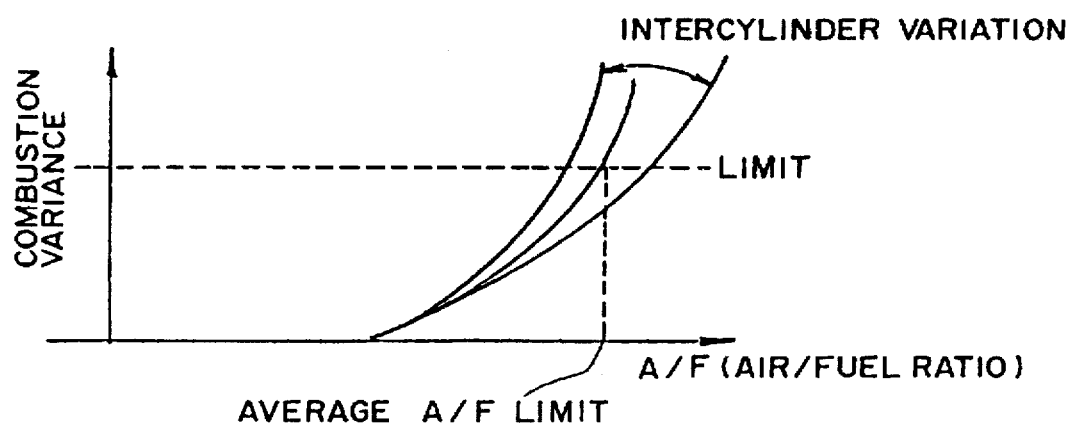
FIG. 14 is a diagram illustrating characteristics of combustion variance in a lean-burn engine.

Namely, as is shown in FIG. 13, the angular acceleration detecting means 107 is provided as principal elements with the crank angle sensor 24, a cylinder-identifying sensor 230 and ECU 25 as a controller. The crank angle sensor 24 is provided with a rotating member 222 which rotates integrally with a crankshaft 201 of the engine.

On a peripheral edge of the rotating member 221, are formed a first, second and third vanes 221A,221B, 221C which extend out in radial directions, respectively. A detector 222, which is arranged to confront the vanes 221A,221B, 221C on opposite sides thereof, either optically or electromagnetically detects passage of the vanes 221A,221B,221C caused by rotation of the rotating member 221 so that corresponding pulses are outputted.

The vanes 221A,221B,221C have an angular length corresponding to a predetermined angle of rotation of the crankshaft and are arranged at intervals of a predetermined angle spacedly from each other in the angular direction.

Specifically, the opposing edges of the mutually adjacent vanes are arranged at an angular interval of 120 degrees.

The cylinder-identifying sensor 230 is fixedly mounted on an unillustrated camshaft, and generates a pulse output whenever the camshaft takes a specific rotational position corresponding to a cylinder while the crankshaft 201 rotates twice and the camshaft rotates once.

The system of this embodiment, which is mounted on a 6-cylinder engine in which ignition is performed in the order of cylinder numbers, is constructed, for example, in such a way that the crankshaft enters a first crankshaft rotational angle region corresponding to one of a first cylinder and a fourth cylinder making up a first cylinder group (preferably and primarily, an expansion stroke in the one cylinder) when the end edge (a leading edge 221C' or a trailing edge) of the third vane 221C has moved past the detector 222 and the crankshaft leaves out of the first rotational angle range when the end edge of the first vane 221A has moved past the detector 222.

Likewise, upon passage of the end edge of the first vane 221A, the crankshaft enters a second crankshaft rotational angle range corresponding to one of a second and fifth cylinders making up a second cylinder group and upon passage of the end edge of the second vane 221B, the crankshaft leaves out of the region.

Further, upon passage of the end edge of the second vane 221B, the crankshaft enters a third crankshaft rotational angle region corresponding to one of a third and sixth cylinders making up a third cylinder group and upon passage of the end edge of the third vane 221C, the crankshaft leaves out of the region.

The distinction between the first cylinder and the fourth cylinder, the distinction between the second cylinder and the fifth cylinder, and the distinction between the third cylinder and the sixth cylinder are conducted based on outputs from the cylinder-identifying sensor 230.

Owing to the above construction, detection of an angular acceleration is performed as will be described next.

During an operation of the engine, ECU 25 is successively inputted with pulse outputs from the crank angle sensor 24 and detection signals from the cylinder-identifying sensor 230 and periodically and repeatedly performs computations.

On the other hand, ECU 25 determines the numbering of each pulse output from crank sensor 24 among pulse outputs successively inputted since the time point of input of a pulse output from the cylinder-identifying sensor 230.

This makes it possible to identify which cylinder the pulse signal inputted from the crank angle sensor 24 corresponds to. Preferably, a cylinder in which an expansion stroke (output stroke: BTDC 75°) is primarily performed at the current time point is identified as an identified cylinder.

Upon determination of entrance to the crankshaft rotational angle region corresponding to an identified cylinder group m (m: 1, 2 or 3) in accordance with a pulse input from the crank angle sensor 24, ECU 25 then starts a period measuring timer (not illustrated).

When the next pulse output is inputted from the crank angle sensor 220, ECU 25 determines a departure from the crankshaft rotational angle region corresponding to the identified cylinder group m, stops the time counting operation of the period measuring timer and reads the result of the time so counted.

The result of the time counting operation represents the time interval TN(n) from the time point of the entrance to the crankshaft rotational angle region corresponding to the identified cylinder group m until the time point of the departure from the region, in other words, the period TN(n) determined by two predetermined crank angles corresponding to the identified cylinder group.

Here, the suffix "n" in the period TN(n) indicates that the period corresponds to the nth (current) igniting operation in the identified cylinder.

Further, the period TN(n), in the case of a 6-cylinder engine, is a 120° cranking period of the identified cylinder group (the time interval between BTDC 75° operation states in the adjacent cylinders) and in more general, is a (720/N)° cranking period in an N-cylinder engine.

Incidentally, the above-described pulse output which indicates a departure from the crankshaft rotational angle region corresponding to the currently identified cylinder also indicates an entrance to the crankshaft rotational angle region corresponding to the cylinder to be identified next.

Accordingly, responsive to this pulse output, a cylinder identifying step is performed with respect to the cylinder to be identified next and the period measuring timer is restarted to begin measurement of a period relating to the cylinder to be identified next.

Figure 10:
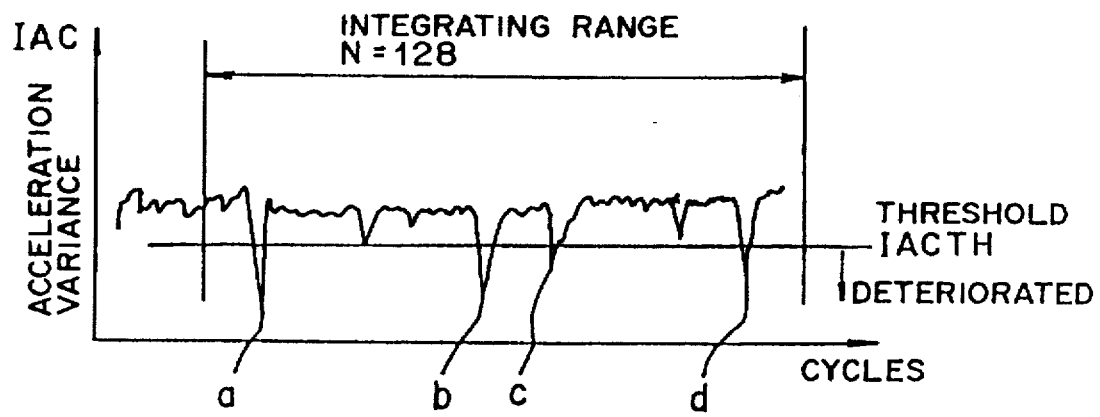
FIG. 10 is a schematic graph for explaining the operation of the system of FIG. 1.

By these operations, ECU 25 detects the 120° cranking period TN(n). A series of states from the #1 cylinder to the #6 cylinder can be illustrated as shown in FIG. 10. The 120° cranking periods are indicated by TN(n−5) to TN(n), respectively. Using these detection values, the angular acceleration ACC(n) of the crankshaft in the period is calculated by the following formula:

$$ACC(n)=1/TN(n)\times\{KL(m)/TN(n)-KL(m-1)/TN(n-1)\} \quad (1\text{-}2)$$

where KL(m) is a segment correction value. To perform a correction with respect to the currently identified cylinder so that any error in the measurement of the period due to variations in the angular intervals of the vanes caused upon fabrication and mounting of the vanes can be eliminated, a segment correction value KL(m) is calculated by ECU 25 in accordance with the following formula:

$$KL(m)=\{KL(m-3)\times(1-XMFDKFG)+KR(n)\times(XMFDKFD)\} \quad (1\text{-}3)$$

where XMFDKFG represents a segment correction value gain.

Figure 8:
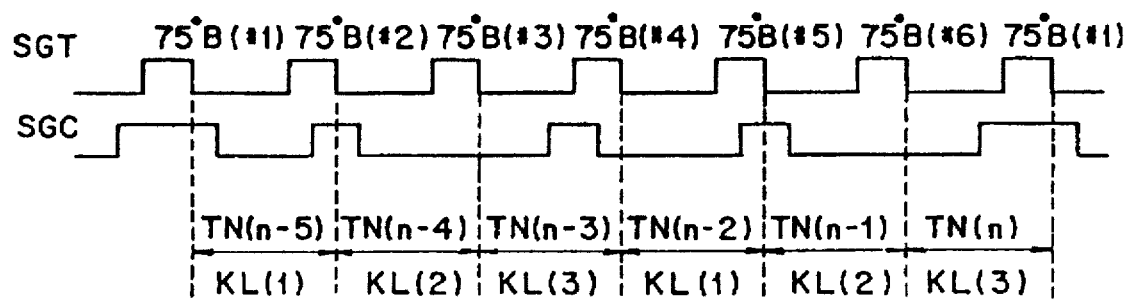
FIG. 8 is a waveform diagram for explaining an operation of the system of FIG. 1.

Now, "m" in KL(m) is set for each corresponding cylinder group, whereby m=1 corresponds to the cylinder groups #1 and #4, m=2 to the cylinder groups #2 and #5, and m=3 to the cylinder groups #3 and #6. As is shown in FIG. 8, KL(1) to KL(3) are repeated.

Further, "m−1" in KL(m−1) means that the segment correction value is that immediately before the segment correction value corresponding to "m". It is therefore indicated that KL(m−1)=KL(3) when KL(m)=KL(1), KL(m−1)=KL(1) when KL(m)=KL(2), and KL(m−1)=KL(2) when KL(m)=KL(3).

Moreover, KL(m−3) in the above formula indicates KL(m) in the preceding correction with respect to the same cylinder group. As KL(m−3) upon computation for the #4 cylinder, KL(1) in the preceding correction for the #1 cylinder is used, and as KL(m−3) upon computation for the #1 cylinder, KL(1) in the preceding correction for the #4 cylinder is used. As KL(m−3) upon computation for the #5 cylinder, KL(2) in the preceding correction for the #2 cylinder is used, and as KL(m−3) upon computation of the #2 cylinder, KL(2) in the preceding correction for the #5 cylinder is used. As KL(m−3) upon computation for the #6 cylinder, KL(3) in the preceding correction for the #3 cylinder is used, and as KL(m−3) upon computation for the #3 cylinder, KL(3) in the preceding correction for the #6 cylinder is used.

On the other hand, KR(n) in the above formula is determined in accordance with the following formula:

$$KR(n)=3 \times TN(n)/\{TN(n)+TN(n-1)+TN(N-2)\} \quad (1-4)$$

This is a measurement value corresponding to an average measurement time period from the measurement time period TN(n−2) of the two measurements ago until the measurement time period TN(n) of the current measurement. Upon calculation of the segment correction value KL(m), KR(n) is subjected to a primary filtering processing by the segment correction value gain XMFDKFG while using the above-described formula.

Incidentally, to realize a method for the determination of a rough road in a vehicle with an internal combustion engine mounted thereon, the engine combustion state controlling system according to this embodiment is provided with the revolution variance detecting means 101 which detects a variance value in angular acceleration by using a detection signal from the angular acceleration detecting means 107.

The computation by the revolution variance detecting means 101 is conducted by determining the difference between a smoothed value, which has been obtained by smoothing a detected angular velocity by the smoothing means, and an angular acceleration outputted from the angular acceleration detecting means 107.

Namely, at the revolution variance detecting means 101, an acceleration variance value ΔACC(n) is calculated by the following formula:

$$\Delta ACC(n)=ACC(n)-ACCAV(n) \quad (1-5)$$

Here, ACCAV(n) is the smoothed value obtained by smoothing the detected angular velocity by the smoothing means and is calculated by conducting a primary filtering processing in accordance with the following formula:

$$ACCAV(n)=\alpha \times ACCAV(n-1)+(1-\alpha) \times ACC(n) \quad (1-6)$$

where α is an updating gain in the primary filtering processing and takes a value of 0.95 or so.

Also provided is the variance value determining means 102 which normalizes the variance value ΔACC(n) outputted from the revolution variance detecting means 101 in accordance with the state of operation of the engine to obtain a normalized variance value IAC(n).

Figure 12:
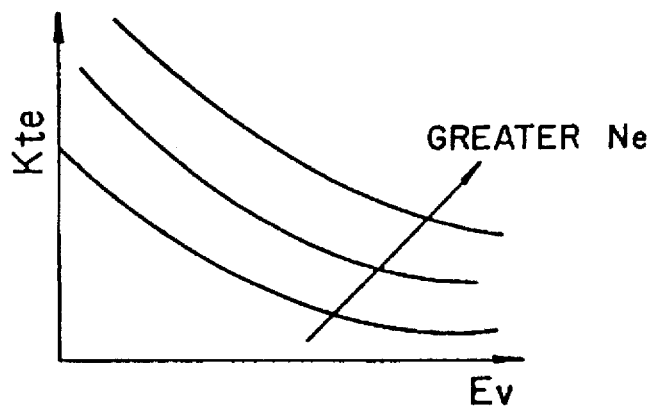
FIG. 12 is a normalizing characteristic map for explaining the operation of the system of FIG. 1.

The calculation of the normalized variance value IAC(n) at the variance data calculating means 102 is conducted in accordance with the following formula:

$$IAC(n)=\Delta ACC(n) \times Kte(Ev,Ne) \quad (1-7)$$

where Kte(Ev,Ne) is an output correction coefficient and is set by the characteristics shown in FIG. 12.

The characteristic of FIG. 12 are illustrated by plotting volumetric efficiencies Ev along the abscissa and output correction coefficients Kte(Ev,Ne), which correspond to the volumetric efficiencies Ev, along the ordinate, and the characteristics of a curve on a more upper right side are adopted as the engine speed Ne becomes higher.

Accordingly, the characteristics of FIG. 12 are stored as a map. From the engine speed Ne calculated from the detection signal of the crank angle sensor 24 or the like and the volumetric efficiency Ev, the output correction coefficient Kte(Ev,Ne) set at ECU 25, so that normalization is performed by a correction corresponding to an engine output.

Also provided is the air/fuel ratio changing data detecting means 104 for determining an air/fuel ratio changing data VAC(j) by comparing each variance data IAC(n) with a predetermined threshold IACTH. It is designed to determine this air/fuel ratio changing data VAC(j) by cumulating the quantities of deteriorations in each of which the variance data IAC(n) is smaller than the threshold IACTH.

Namely, the air/fuel ratio changing data VAC(j) is calculated by the following formula:

$$VAC(j)=\Sigma\{IAC(j)<IACTH\} \times \{IACTH-IAC(j)\} \quad (1-8)$$

In the above formula, {IAC(j)<IACTH} is a function which stands for "1" when IAC(j)<IACTH is met but for "0" when this condition is not met. When each variance data IAC(n) is smaller than the predetermined threshold IACTH, this negative difference is cumulated as a deterioration quantity.

Accordingly, the air/fuel ratio changing data VAC(j) is obtained by cumulating each quantity of deterioration which is weighted by the difference between the threshold IACTH and the normalized variance value IAC(j), so that effects of values around the threshold can be minimized to precisely reflect the state of deterioration.

Further, the predetermined threshold IACTH in the air/fuel ratio changing data detecting means 104 is updated corresponding to the state of operation of the engine by the threshold updating means.

Incidentally, the above-described suffix "j" indicates the number of each cylinder.

As an alternative, the air/fuel ratio changing data VAC(j) may also be determined by using a simpler program and cumulatively counting the number of detections in each of which the variance data IAC(n) is smaller than the threshold IACTH (namely, VAC(j)=Σ{IAC(j)<IACTH}).

Computation results from the air/fuel ratio changing data detecting means 104, such as those described above, are employed at the combustion state controlling means.

Namely, the combustion state controlling means is provided with the revolution variance control mode logic C which will be described subsequently herein, and controls the combustion variance adjusting element of the engine by a correction coefficient KAC(j) calculated with reference to an air/fuel ratio changing data VAC(j) calculated by the air/fuel ratio changing data detecting means 104.

As the reference value for the control of the combustion variance adjusting element by the combustion state control means, a permissible variance value VAC0 is set. Control corresponding to the difference between the air/fuel ratio changing data VAC(j) and the permissible variance value VAC0 is performed in accordance with the flow chart of FIG. 7.

The control by the combustion variance adjusting element is performed so that the air/fuel ratio changing data VAC(j) falls within the permissible variance value VAC0.

More specifically, the control by the combustion variance adjusting element is performed by correcting the basic injection pulse width upon injection of fuel as described above. The injection pulse width Tinj(j) is calculated in accordance with the following formula:

$$Tinj(j)=TB \times KAC(j) \times K \times KAFL+Td \qquad (1-9)$$

Further, the correction coefficient KAC(j) in the above formula can be adjusted as will be described next.

First, where the variance data IAC(n) has become smaller than the threshold IACTH three times or more, the combustion variance value is taken as having deteriorated to or beyond the predetermined level. An enriching correction for increasing the fuel injection quantity is therefore performed by calculating a correction coefficient KAC(j) in accordance with the following formula:

$$KAC(j)=KAC(j)+ZECPAL \cdot \{VAC(j)-VACO\} \qquad (1-10)$$

Figure 9:
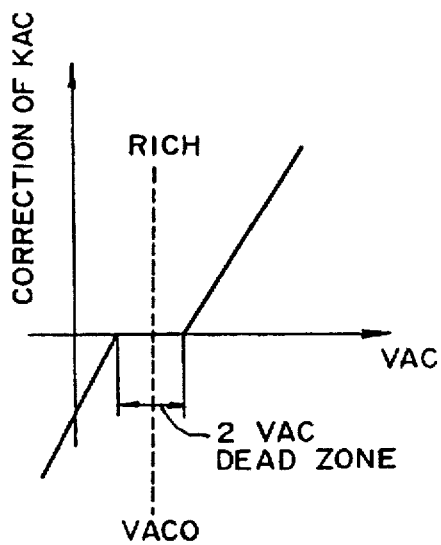
FIG. 9 is a correction characteristic map for explaining the operation of the system of FIG. 1.

This is to calculate the correction value of the rich-side upper right characteristics among the correction characteristics shown in FIG. 9, and ZECPAL is a coefficient indicating the gradient of the characteristics. KAC(j) on the right side indicates a correction coefficient calculated in the preceding computation cycle (n−1) with respect to the cylinder numbered j and is updated according to the above formula.

FIG. 9 shows correction characteristics by plotting air/fuel ratio changing data VAC along the abscissa and correction coefficients KAC along the ordinate.

On the other hand, where the variance data IAC(n) has become smaller than the threshold IACTH less than once in 128 cycles, the combustion is taken as permitting further leaning so that a leaning correction for reducing the fuel injection quantity is performed by calculating a correction coefficient KAC(j) in accordance with the following formula:

$$KAC(j)=KAC(j)-ZECPAL \cdot \{VAC(j)-VACO\} \qquad (1-11)$$

This is to calculate the correction value of the lean-side lower left characteristics shown in FIG. 9, and ZECPAL is a coefficient indicating the gradient of the characteristics.

Further, where the variance data IAC(n) becomes smaller than the threshold IACTH 1 to 2 times in 128 cycles, the engine is taken as being in an adequate operation state so that no change is made to the correction coefficient KAC(j) to maintain the fuel injection quantity in the preceding state.

This corresponds to horizontal characteristics between the lean-side lower left characteristics and the rich-side upper right characteristics shown in FIG. 9, and forms a dead zone for corrections.

The permissible variance value VACO is a value corresponding to a target value (10% or so) of COV (coefficient of variance). By preventing any fuel correction within the range of ΔVAC on both sides of the combustion variance target value VACO, it is possible to avoid a limit cycle which would otherwise be caused by an error due to evaluation of rotational variance within a limited period (128 cycles) or due to computation based on a value smaller than the threshold.

The above-described correction coefficient KAC(j) is designed to be clipped at both upper and lower limits and is set to meet, for example, the following inequality: 0.85<KAC(j)<1.1. The correction coefficient is therefore set to avoid any abrupt correction and to gradually perform a correction so that occurrence of a shock or the like can be prevented and the control can be performed stably.

Further, the air/fuel ratio changing data VAC(j) can be updated every preset number of combustions, for example, every 128 (or 256) cycles. By performing the control while ascertaining the state of combustion over a relative long period, the control can be performed stably and surely while reflecting statistical characteristics.

In this manner, control is performed to slightly change the air/fuel ratio for the internal combustion engine, which is in operation in the vicinity of a lean burn limit air/fuel ratio, toward a leaner side when the combustion is good but toward a richer side when the combustion has deteriorated.

In this embodiment, the vehicle with the internal combustion engine mounted thereon is determined or estimated to be running on a rough road on the basis of detection of revolution variance states, each of which indicates a deterioration in combustion, in plural cylinders during an operation in the vicinity of the lean burn limit air/fuel ratio for the internal combustion engine, whereby the control mode is changed to the anti-rough-road mode.

Further, the above-described variance data are calculated as revolution variance states indicating deteriorations in combustion, respectively, when the revolution variance has taken a value on a deteriorated combustion side of a combustion state determining threshold at least as many times as a predetermined count during a predetermined period spanning over plural ignition strokes.

Namely, the control mode is changed to the anti-rough-road mode under the conditions that three or more cylinders, the variance data IAC(n) of each of which becomes equal to or smaller than a threshold IACTH at least 3 times during 128 cycles, are detected.

Under the minimal condition that variance data indicate deteriorations in combustion and an average of variance data on the deteriorated combustion side of the combustion state determining threshold falls on a deteriorated combustion side of a second combustion state determining threshold, the vehicle is determined or estimated to be running on a rough road so that the control mode is changed to the anti-rough-road mode.

In other words, the control mode is changed to the anti-rough-road mode under the condition that an average of variance data IAC(n) on a deteriorated combustion side of the threshold IACTH falls on a deteriorated combustion side of a value preset as the second combustion state determining threshold.

Further, under the minimal condition that the air/fuel ratio changing data of at least one cylinder continuously motivates to change the air/fuel ratio to a richer side during an operation of the internal combustion engine in the vicinity of the lean-burn limit air/fuel ratio, the vehicle with the internal combustion engine mounted thereon is determined or estimated to be running on a rough road so that the control mode is changed to the anti-rough-road mode.

Namely, under the minimal condition that during an operation in the vicinity of the lean-burn limit air/fuel ratio of the internal combustion engine, variance data IAC(n) indicating deteriorations in combustion, respectively, are detected with respect to plural cylinders at the variance data calculating means 102 in the revolution variance detecting means 101 and the air/fuel ratio changing data VAC(j) in at least one cylinder continuously motivates to change the air/fuel ratio toward a richer side at the-air/fuel ratio changing data detecting means 104, the vehicle with the internal combustion engine mounted thereon is determined or estimated to be running on a rough road so that by the revolution variance state determining logic A, the control mode is changed from a state controlled under the revolution variance control mode logic C to a state controlled under the anti-rough-road mode logic B.

Described specifically, the control mode is changed to the anti-rough-road mode under the condition that there is a cylinder which produced three times in straight the state that the above-mentioned air/fuel ratio changing data VAC(j) becomes greater than a predetermined value.

In addition, the vehicle with the internal combustion engine mounted thereon is estimated to be running on a rough road on the basis of indication of deteriorations in combustion in plural cylinders by variance data; and the internal combustion engine is then operated at a testing air fuel/ratio on a side richer than the lean limit air/fuel ratio and based on revolution variances detected during the operation, the vehicle is determined to be running on the rough road.

The anti-rough-road mode is designed so that when the control mode is changed to the anti-rough-road mode as described above, a testing air/fuel ratio operation is performed at the predetermined testing air/fuel ratio by the testing-air/fuel-ratio-operating means 203 in the anti-rough-road mode.

The testing air/fuel ratio is set on a side richer than the air/fuel ratio in the vicinity of the lean limit. To ascertain whether the revolution variance is caused by a deterioration in combustion or by running on a rough road, the lean operation is terminated temporarily and an operation is conducted on a rich side.

The testing air/fuel ratio operation is conducted by performing an operation for 128×2 cycles in a stoichiometric feedback at an EGR-free open-loop ignition timing (i.e., an ignition timing set without EGR), so that the testing air/fuel ratio operation is performed in such a state as permitting exclusion of interferences by other elements.

Variance data are calculated under the operation at the testing air/fuel ratio, and revolution variances during the operation are detected based on the variance data.

Further, the vehicle is determined to be running on a rough road when variance data in plural cylinders indicate revolution variances under the operation at the testing air/fuel ratio.

In an operation by the testing air/fuel ratio operating means 203, whether running on a rough road or not is also determined by conducting calculation of variance data IAC (n) at the variance data calculating means 102 in the revolution variance detecting means 101 and then determining at the rough-road-running determination means 202 whether the variance data IAC(n) meet predetermined conditions or not.

Here, the determination at the rough-road-running determination means 202 is effected under the condition that "there are three or more cylinders each of which produces at least three times a variance data IAC(n) not greater than the threshold IACTH during 256 cycles". When this condition is met, it is determined that the occurrence of the revolution variances is not attributed to the lean-burn but is attributed to running on a rough road because the occurrence of revolution variances has not been improved despite the operation on the rich side.

When the vehicle has been determined to be running on a rough road, the internal combustion engine is operated at a lean air/fuel ratio for a rough road, which is on a side leaner than the testing air/fuel ratio, and upon detection of an ending state of revolution variances during the operation, the running on the rough road is determined to have ended.

Namely, when the vehicle has been determined to be running on a rough road by the rough-road-running determination means 202, an operation at the rough-road lean air/fuel ratio on the side leaner than the testing air/fuel ratio is performed by the rough-road lean air/fuel ratio operating means 204.

Accordingly, even if the operation may still not become a lean limit operation, the operation is performed on a desired lean side, thereby making it possible to achieve both an improvement in gas mileage and a reduction in NOx.

This is based on the recognition that the state at the time of rough-road running is not a state in which the state of combustion has to be improved but is an operation state in which a lean operation is permissible.

Such a lean operation is then performed for 128 cycles. As the correction coefficient KAC for the control of fuel injection during this period, the value immediately before the change into the anti-rough-road mode is adopted.

Further, the determination of ending of revolution variances by the revolution-variance-ended-state detecting means 206 is performed whenever a rough-road lean air/fuel ratio, 128-cycle operation as that mentioned above is completed. It is determined whether or not there are three or more cylinders each of which does not produce any variance data IAC(n) not greater than the threshold IACTH during the 128 cycles. If this condition is met, it is determined at the rough-road-running end determining means 205 that the rough road has ended and revolution variances have been eliminated.

Unless ending of the rough road is detected, the operation by the rough-road lean air/fuel ratio operating means 204 will be continued for 128×20 cycles.

After an elapse of 128×20 cycles, an operation by the testing-air/fuel-ratio operating means 203 is performed again to confirm if the vehicle is still running on the rough road.

Incidentally, a misfire determining reference value has been set. Based on a change in the variance data IAC(n) toward the combustion deteriorated side beyond the misfire determining reference value, a misfire is determined, information on the misfire is stored at a misfire information address (j) for the current cylinder, and control is performed for the misfire.

Since the control system for practicing the method according to the first embodiment of the present invention for the determination of a rough road in a vehicle with a lean-burn internal combustion engine mounted thereon is constructed as described above, operations illustrated in the flow charts of FIGS. 4 through 7 are successively performed during a lean-burn operation.

Figure 4:
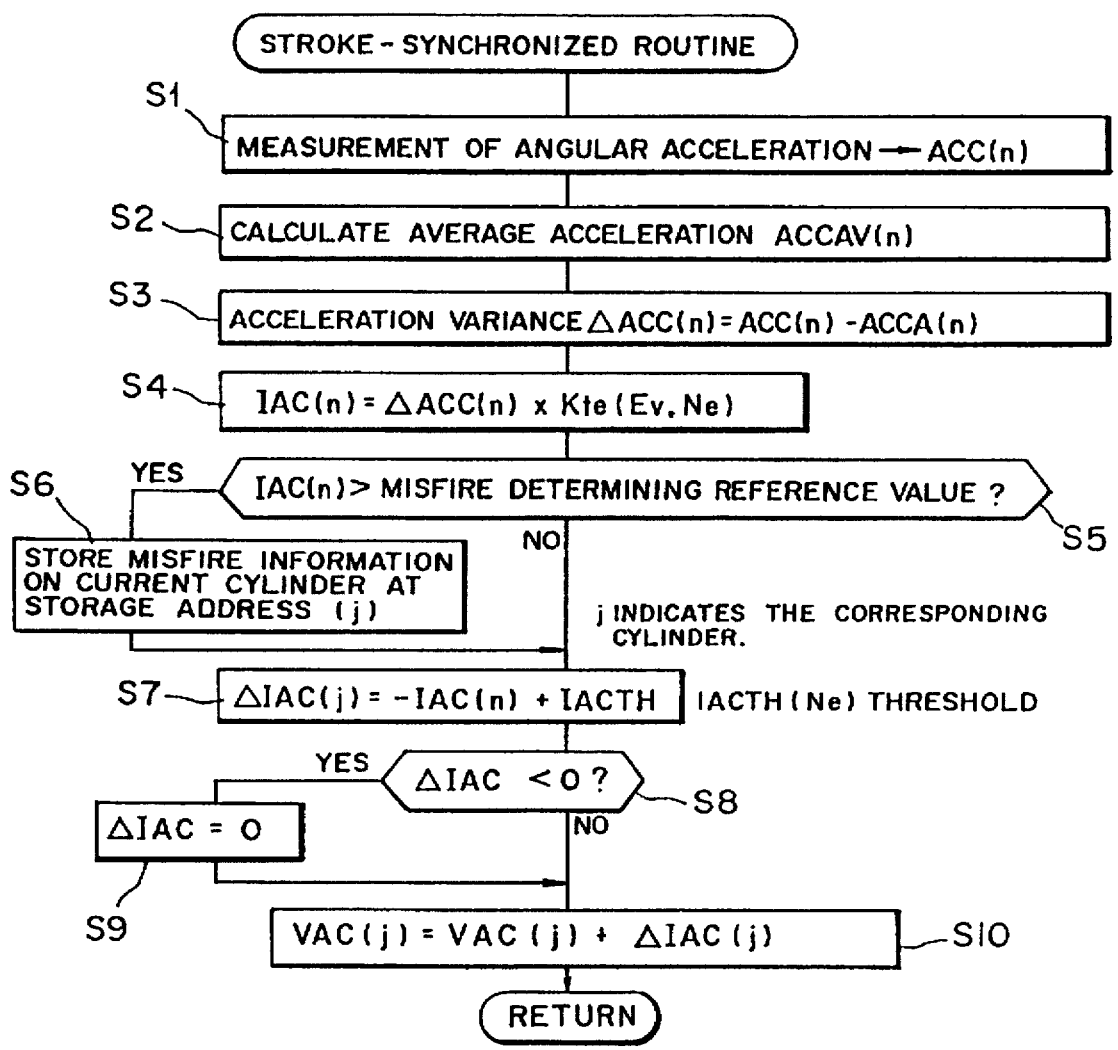

First, in step S1 shown in FIG. 4, an angular acceleration ACC(n) is detected by the angular acceleration detecting means 107.

Here, computation employed for the detection is performed in accordance with the following formula:

$$ACC(n)=1/TN(n) \cdot \{KL(m)/TN(n)-KL(m-1)/TN(n-1)\} \qquad (1\text{-}12)$$

where KL(m) is a segment correction value. To perform a correction with respect to the currently identified cylinder so that any error in the measurement of the period due to variations in the angular intervals of the vanes caused upon fabrication and mounting of the vanes can be eliminated, a segment correction value KL(m) is calculated in accordance with the following formula:

$$KL(m)=\{KL(m-3)\times(n1-XMFDKFG)+KR(n)\times(XMFDKFD)\} \quad (1\text{-}13)$$

where XMFDKFG represents a segment correction value gain.

On the other hand, KR(n) in the above formula is determined in accordance with the following formula:

$$KR(n)=3 \cdot TN(n)/\{TN(n)+TN(n-1)+TN(n-2)\} \quad (1\text{-}14)$$

This is a measurement value corresponding to an average measurement time period from the measurement time period TN(n-2) of the two measurements ago until the measurement time period TN(n) of the current measurement. Upon calculation of the segment correction value KL(m), the primary filtering processing by the segment correction value gain XMFDKFG is performed by using the above-described formula.

An average acceleration ACCAV(n) is then calculated in step S2.

Here, ACCAV(n) is the smoothed value obtained by smoothing the detected angular velocity ACC(n) by the smoothing means and is calculated by conducting a primary filtering processing in accordance with the following formula:

$$ACCAV(n)=\alpha \cdot ACCAV(n-1)+(1-\alpha) \cdot ACC(n) \quad (1\text{-}15)$$

where $\alpha$ is an updating gain in the primary filtering processing and takes a value of 0.95 or so.

In step S3, an acceleration variance value $\Delta ACC(n)$ is next detected by the revolution variance detecting means 101.

Namely, by determining the difference between the angular velocity ACC(n) detected by the angular acceleration detection means 107 and the average acceleration ACCAV (n) as the smoothed value obtained by smoothing by the smoothing means, an acceleration variance value $\Delta ACC(n)$ is calculated in accordance with the following formula:

$$\Delta ACC(n)=ACC(n)-ACCAV(n) \quad (1\text{-}16)$$

In step S4, a variance data IAC(n), which has been obtained by normalizing the variance value $\Delta ACC(n)$ outputted from the revolution variance detecting means 101 in accordance with the state of operation of the engine, is calculated by the variance data calculating means 102 in accordance with the following formula:

$$IAC(n)=\Delta ACC(n) \cdot Kte(Ev,Ne) \quad (1\text{-}17)$$

where Kte(Ev,Ne) is an output correction coefficient and is set by the characteristics shown in FIG. 12.

The characteristic of FIG. 12 are illustrated by plotting volumetric efficiencies Ev along the abscissa and output correction coefficients Kte(Ev,Ne), which correspond to the volumetric efficiencies Ev, along the ordinate, and the characteristics of a curve on a more upper right side are adopted as the engine speed Ne becomes higher.

Accordingly, in the characteristics of FIG. 12 stored as a map, the output correction coefficient Kte(Ev,Ne) is set at ECU 25 from the engine speed Ne calculated from the detection signal of the crank angle sensor 220 or the like and the volumetric efficiency Ev, so that normalization is performed by a correction corresponding to an engine output.

Here, a description will be made of control characteristics where normalization is conducted corresponding to an engine output as described above.

Namely, an angular acceleration $\omega'$ is expressed as shown by the following formula:

$$\omega'=1/Ie \cdot (Te-Tl) \quad (1\text{-}18)$$

where Te is an engine torque, Tl is a load torque, and Ie is a moment of inertia.

On the other hand, $$\omega'=\omega_o'+\Delta\omega' \quad (1\text{-}19)$$

where $\omega_o'$ is an average angular acceleration.

From formulae (1-18) and (1-19), $$\omega_o' + \Delta\omega' = 1/Ie \cdot (Te - Tl)$$
$$= 1/Ie \cdot (Te_o - Tl) + \Delta Te/Ie$$
$$\text{Hence, } \Delta\omega' = \Delta Te/Ie \quad (1\text{-}20)$$

Incidentally, according to the above-described detection method of the angular acceleration ACC(n) in step S1, engine torque information is stored relatively well where no load disturbance exists. Further, as is indicated by formula (1-20), by conducting the control while using a variance $\Delta\omega'$ from the average angular acceleration $\omega_o'$ [acceleration variance value $\Delta ACC(n)$] and the normalized output taking the moment of inertia Ie into account [normalized variance value IAC(n)], the control can be performed while taking into account the statistical nature of combustion variance and surely reflecting the combustion variance.

After the operation of step S4 has been performed, determination of a misfire is then performed in step S5.

Namely, it is determined whether or not the variance data IAC(n) has changed toward the combustion deteriorated side beyond the misfire determining reference value set by the misfire determining reference value setting means. If determined to have changed, occurrence of a misfire is determined.

If this determination has been made, step S6 is performed to store information on the misfire at the misfire information address (j) for the current cylinder so that control for the misfire is performed.

On the other hand, if no misfire has been determined or after step S6 has been performed subsequent to determination of a misfire, operations by the air/fuel ratio changing data detecting means 104 in step S7 to step S10 are performed, whereby the variance data IAC(n) and the predetermined threshold IACTH are compared and an air/fuel ratio changing data VAC(j) is calculated in accordance with the following formula:

$$VAC(j)=\Sigma\{IAC(j)<IACTH\}\times\{IACTH-IAC(j)\} \quad (1\text{-}21)$$

First, in step S7, the difference $\Delta IAC(n)$ between the variance data IAC(n) and the predetermined threshold IACTH is calculated and in step S8, it is then determined whether the difference $\Delta IAC(n)$ is negative or not.

This determination corresponds to the function {IAC(j) <IACTH} in the above formula, and an operation is performed to take "1" when IAC(j)<IACTH is met but "0" when this condition is not met.

Namely, when IAC(j)<IACTH is met, $\Delta IAC(n)$ is positive. The routine then advances through the "NO" route and cumulation of the air/fuel ratio changing data VAC(j) in step S10 is performed, resulting in the state that the above-described function takes "1".

When IAC(j)<IACTH is not met, on the other hand, $\Delta IAC(n)$ is negative. The routine then advances through the "YES" route and $\Delta IAC(n)=0$ is performed in step S9. As a consequence, no cumulation of the air/fuel ratio changing data VAC(j) is performed in step S10, resulting in the state that the above-described function takes "0".

Accordingly, when the variance data IAC(n) is smaller than the predetermined threshold IACTH as indicated by dots a to d in FIG. 10, these negative differences are cumulated as deterioration quantities.

Accordingly, the air/fuel ratio changing data VAC(j) is obtained by cumulating each deterioration quantity which is weighted by the difference between the threshold IACTH and the variance data IAC(j), so that effects of values around the threshold can be minimized to have the state of deterioration precisely reflected in the air/fuel ratio changing data VAC(j).

Further, the predetermined threshold IACTH in the air/fuel ratio changing data detecting means 104 is updated corresponding to the state of operation of the engine by the threshold updating means, thereby making it possible to realize an operation state still closer to the lean limit.

Incidentally, the above-described suffix "j" indicates the number of each cylinder. The air/fuel ratio changing data VAC(j) is cumulated with resect to each cylinder j.

In this manner, the variance data IAC(n) and the air/fuel ratio changing data VAC(j) are calculated every computation cycle.

On the other hand, operations under the revolution variance state determining logic A are performed in accordance with the flow chart of FIG. 5.

First, it is determined in step A1 whether the engine is in lean-burn feedback operation or not. If it is in lean-burn feedback operation, step A2 and its subsequent steps will be performed.

If it is not in lean-burn feedback operation, a return operation is performed to assume a state in which the next computation cycle is awaited.

In step A2, it is determined based on a detection signal from the shift detecting means 231 if shifting is under way or it is within 3 seconds after shifting. If this condition is met, the routine returns to the determination in step A1 through the "YES" route without performing step A3 and its subsequent steps.

This is not to change the operation mode but to maintain the current operation state during the shifting or within 3 seconds after the shifting. This has been adopted in view of the fact that a revolution variance occurs in such a period due to the shifting and makes it difficult to detect a revolution variance caused by a deterioration in combustion or running on a rough road.

In step A3 through step A5, determination will be made as to the conditions for a change into the anti-rough-road mode.

In step A3, it is first determined by using variance data IAC(n), which have been calculated by the variance data calculating means 102 in the revolution variance detecting means 101, whether or not there are three or more cylinders each of which has produced a variance data IAC(n) not greater than the threshold IACTH at least three times in 128 cycles.

This is to determine that the state of occurrence of revolution variances is more often in view of the individual values of the variance data IAC(n).

Next, it is determined in step A4 whether or not the average of the variance data IAC(n) not greater than the threshold IACTH in the 128 cycles is not smaller than a preset value.

This is to determine that the state of occurrence of the revolution variances is more often on average than a predetermined level in view of the individual values of the variance data IAC(n).

In step A5, it is then determined using a air/fuel ratio changing data VAC(j), which has been calculated by the air/fuel ratio changing data detecting means 104 in the revolution variance detecting means 101, whether or not the air/fuel ratio changing data VAC(j) in the 128 cycles is greater than a predetermined determination value.

As a consequence, it is determined that the state of occurrence of revolution variances as viewed from the cumulative value of the extra quantities of the variance data IAC(n) beyond the threshold IACTH is, as a whole, equal to or greater than the predetermined level.

If the three conditions in the above-described step A3 through step A5 are all met, the routine then advances through the "YES" route so that a change into the anti-rough-road mode is effected to actuate the anti-rough-road mode logic B.

If at least one of the three conditions is not met, the revolution variance state is not such a state as occurred upon running on a rough road so that no estimation will be performed as to the possibility of running on a rough road. The routine hence advances through the "NO" route to select the revolution variance control mode which actuates the revolution variance control mode logic C, the ordinary control system.

The anti-rough-road mode logic B performs operations in accordance with the flow chart of FIG. 6. First, a testing air/fuel ratio operation is performed by the testing-air/fuel-ratio-operating means 203 in step B1.

The testing air/fuel ratio is set on a side richer than the air/fuel ratio in the vicinity of the lean limit. To ascertain whether the revolution variance is caused by a deterioration in combustion or by running on a rough road, the lean operation is terminated temporarily and an operation is conducted on a rich side.

The testing air/fuel ratio operation is conducted by performing an operation for 128×2 cycles in a stoichiometric feedback at an EGR-free open-loop ignition timing (i.e., an ignition timing set without EGR), so that the testing air/fuel ratio operation is performed in such a state as permitting exclusion of interferences by other elements.

In the operation by the testing air/fuel ratio operating means 203, whether running on a rough road or not is also determined by conducting calculation of variance data IAC (n) at the variance data calculating means 102 in the revolution variance detecting means 101 and then determining at the rough-road-running determination means 202 whether the variance data IAC(n) meet predetermined conditions or not.

Namely, it is determined in step B2 whether or not "there are three or more cylinders each of which is producing at least three times a variance data IAC(n) not greater than the threshold IACTH during 256 cycles". When this condition is met, it is determined that the occurrence of the revolution variances is not attributed to the lean-burn but is attributed to running on a rough road because the occurrence of revolution variances has not been improved despite the operation on the rich side. Accordingly, the routine advances through the "YES" route and step B3 and its subsequent steps are performed.

In step B3 and its subsequent steps, when the vehicle has been determined to be running on a rough road, the internal combustion engine will be operated at a lean air/fuel ratio for a rough road, which is on a side leaner than the testing air/fuel ratio, and upon detection of an ending state of revolution variances during the operation, the running on the rough road will be determined to have ended.

First, a lean operation is performed during 128 cycles in step B3.

Namely, when the vehicle has been determined to be running on a rough road by the rough-road-running determination means 202, an operation at the rough-road lean air/fuel ratio on the side leaner than the testing air/fuel ratio is performed by the rough-road lean air/fuel ratio operating means 204.

Accordingly, even if the operation may still not become a lean limit operation, the operation is performed on a desired lean side, thereby making it possible to achieve both an improvement in gas mileage and a reduction in NOx.

When running on a rough road, it is not such a state that the state of combustion has to be improved. No inconvenience therefore arises even if a lean operation is performed.

Such a lean operation is performed using, as the correction coefficient KAC for the control of fuel injection, the value immediately before the change into the anti-rough-road mode.

Next, step B4 is performed so that the determination of ending of revolution variances by the revolution-variance-ended-state detecting means 206 is performed whenever a rough-road lean air/fuel ratio, 128-cycle operation such as that mentioned above is completed.

Described specifically, it is determined whether or not there are three or more cylinders each of which does not produce any variance data IAC(n) not greater than the threshold IACTH during the 128 cycles.

If this condition is met, it is determined at the rough-road-running end determining means 205 that the rough road has ended and revolution variances have been eliminated.

Unless ending of the rough road is detected, the rough road is still continuing. The routine therefore advances through the "NO" route to perform step B5. The routine advances through the "NO" route, and step B3 is performed so that the operation by the rough-road lean air/fuel ratio operating means 204 is continued for 128×20 cycles.

After an elapse of 128×20 cycles, the routine advances from step B5 through the "YES" route and step B1 is performed. An operation by the testing air/fuel ratio operating means 203 is hence performed again to confirm if the vehicle is still running on the rough road.

When the mode which performs the revolution variance control mode logic C is selected in accordance with the revolution variance state determining logic A of FIG. 5, operations are performed in accordance with the flow chart of FIG. 7.

First, it is determined in step C1 whether or not a case in which the variance data IAC(n) is not greater than the threshold IACTH is occurring three times or more during 128 cycles.

If occurring, it is interpreted that the combustion variance values has deteriorated to or beyond a predetermined level. The routine therefore advances through the "YES" route to perform step C2. An enriching correction for increasing the fuel injection quantity is hence performed by calculating a correction coefficient KAC(j) in accordance with the following formula:

$$KAC(j)=KAC(j)+ZFCPAL \cdot \{VAC(j)-VACO\} \quad (1\text{-}22)$$

This is to calculate the correction value of the rich-side upper right characteristics out of the correction characteristics shown in FIG. 9. ZECPAL is a coefficient indicating the gradient of the characteristics. Further, KAC(j) on the right side indicates a correction coefficient calculated with respect to the cylinder, which is numbered "j", in the preceding computation cycle (n−1), and is updated in accordance with the above formula.

When a variance data IAC(n) not greater than the threshold IACTH occurs less than once in 128 cycles, on the other hand, the "NO" route is taken in each of step C1 and step C3.

In this case, step C5 is performed, and the combustion is taken as permitting further leaning so that a leaning correction for reducing the fuel injection quantity is performed by calculating a correction coefficient KAC(j) in accordance with the following formula.

$$KAC(j)=KAC(j)-ZFCPAL \cdot \{VAC(j)-VACO\} \quad (1\text{-}23)$$

This is to calculate the correction value of the lean-side lower left characteristics shown in FIG. 9, and ZECPAL is the coefficient indicating the gradient of the characteristics.

Further, when a variance data IAC(n) not greater than the threshold IACTH occurs 1–2 times in 128 cycles, the engine is taken as being in an adequate operation state so that no change is made to the correction coefficient KAC(j) to maintain the fuel injection quantity in the preceding state (see step C4).

This corresponds to the horizontal characteristics between the lean-side lower left characteristics and the rich-side upper right characteristics shown in FIG. 9, and forms a dead zone for corrections.

Incidentally, the permissible variance value VACO is the value corresponding to the target value (10% or so) of COV (coefficient of variance). By preventing any fuel correction within the range of $\Delta$VAC on each side of the permissible variance value VACO, it is possible to avoid a limit cycle which would otherwise be caused by an error due to evaluation of rotational variance within a limited period (128 cycles) or due to computation based on a value smaller than the threshold.

Further, the above-mentioned correction coefficient KAC (j) is clipped within the upper and lower limits in step C6.

Namely, the correction coefficient KAC(j) is set to be clipped within the range of 0.85<KAC(j)<1.1, so that a correction is gradually performed without avoiding any abrupt correction. Accordingly, occurrence of a shock or the like can be prevented and the control can be performed stably.

In this manner, control is performed to slightly change the air/fuel ratio for the internal combustion engine, which is in operation in the vicinity of a lean burn limit air/fuel ratio, toward a leaner side when the combustion is good but toward a richer side when the combustion has deteriorated.

The operations are performed as described above. According to this embodiment, effects or advantages can be brought about as will be described next.

(1) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(2) Owing to the effect or advantage in the preceding item, the emission of NOx can be minimized.

(3) The detection and control of revolution variance in each cylinder can be performed by a single crank angle sensor, thereby making it possible to perform surer lean-burn control and a stoichiometric operation at low cost.

(4) No additional sensor is needed to cope with rough roads, thereby making it possible to perform a lean operation without raising the cost.

(5) Even during running on a rough road, a lean operation can be performed, thereby making it possible to improve the gas mileage and also to reduce the emission of NOx.

(b) Description of the second embodiment

An engine for an automotive vehicle, the engine being equipped with the system according to this embodiment, is also provided with the construction depicted in FIGS. 2 and 3 like the first embodiment so that its description is omitted herein.

Figure 15:
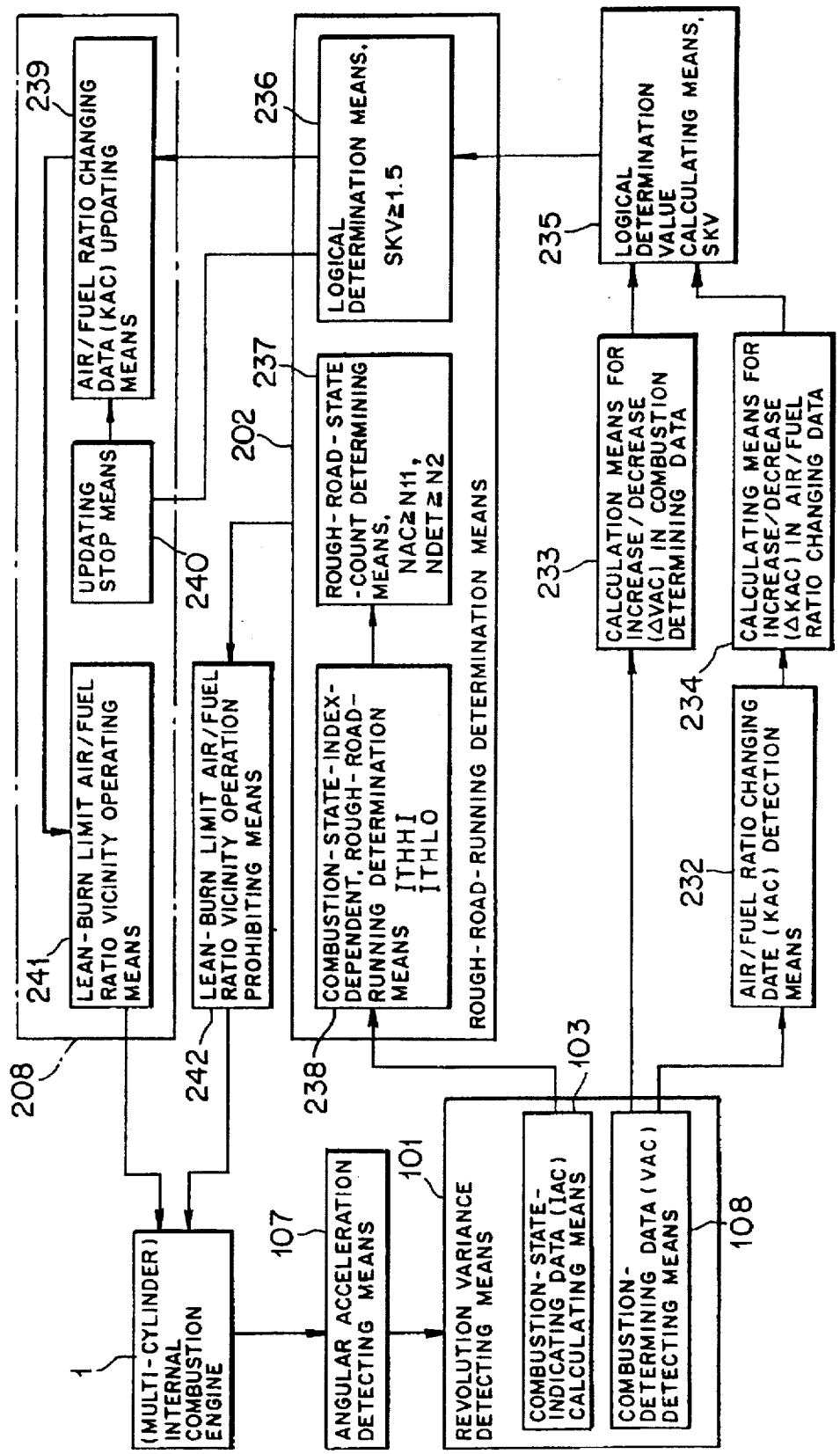
FIG. 15 is a control block diagram according to a second embodiment of the present invention for the determination of a rough road in a vehicle with an internal combustion engine mounted thereon.

Now paying attention to a portion relating to fuel injection control (air/fuel ratio control) in this embodiment too, for this fuel injection control (control of an injector drive time), ECU 25 is provided, as shown in FIG. 15, with functions of the revolution variance detecting means 101, combustion-state-indicating data calculating means 103, combustion-determining data detecting means 108, the angular acceleration detecting means 107, the rough-road-running determination means 202, air/fuel ratio changing data detection means 232 and lean-burn combustion limit operating means 208.

To perform operations in accordance with the flow charts of FIGS. 17 through 20, ECU 25 is also provided, as is illustrated in FIG. 15, with calculation means 233 for increase/decrease in combustion determining data, calculation means 234 for increase/decrease in air/fuel ratio changing data, and logical determination value calculating means 235.

Further, ECU 25 is also provided as the rough-road-running determination means 202 with logical determination means 236, rough-road-state-count determining means 237, and combustion-state-index-dependent, rough-road-running determination means 238. ECU 25 is constructed so that their computation results are outputted to the lean-burn limit operating means 208 and lean-burn limit air/fuel ratio vicinity operation prohibiting means 242.

The lean-burn limit operating means 208 is provided with air/fuel ratio changing data updating means 239 and the updating stop means 240. ECU 25 is constructed so that their computation results are used at lean-burn limit air/fuel ratio vicinity operating means 241.

Figure 16:
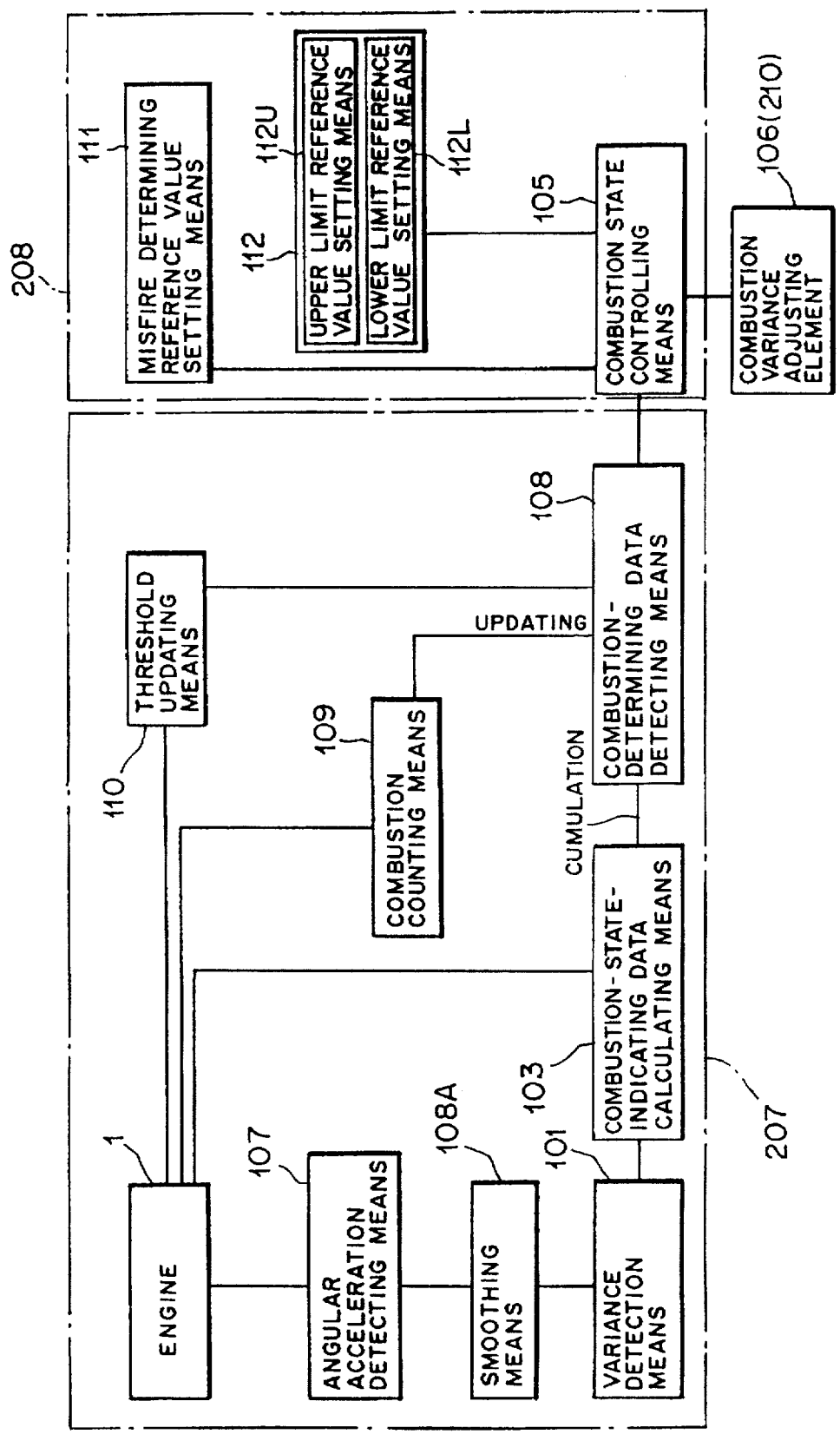
FIG. 16 is a control block diagram for an essential part of a system in which the system of FIG. 15 is included.
Figure 17:
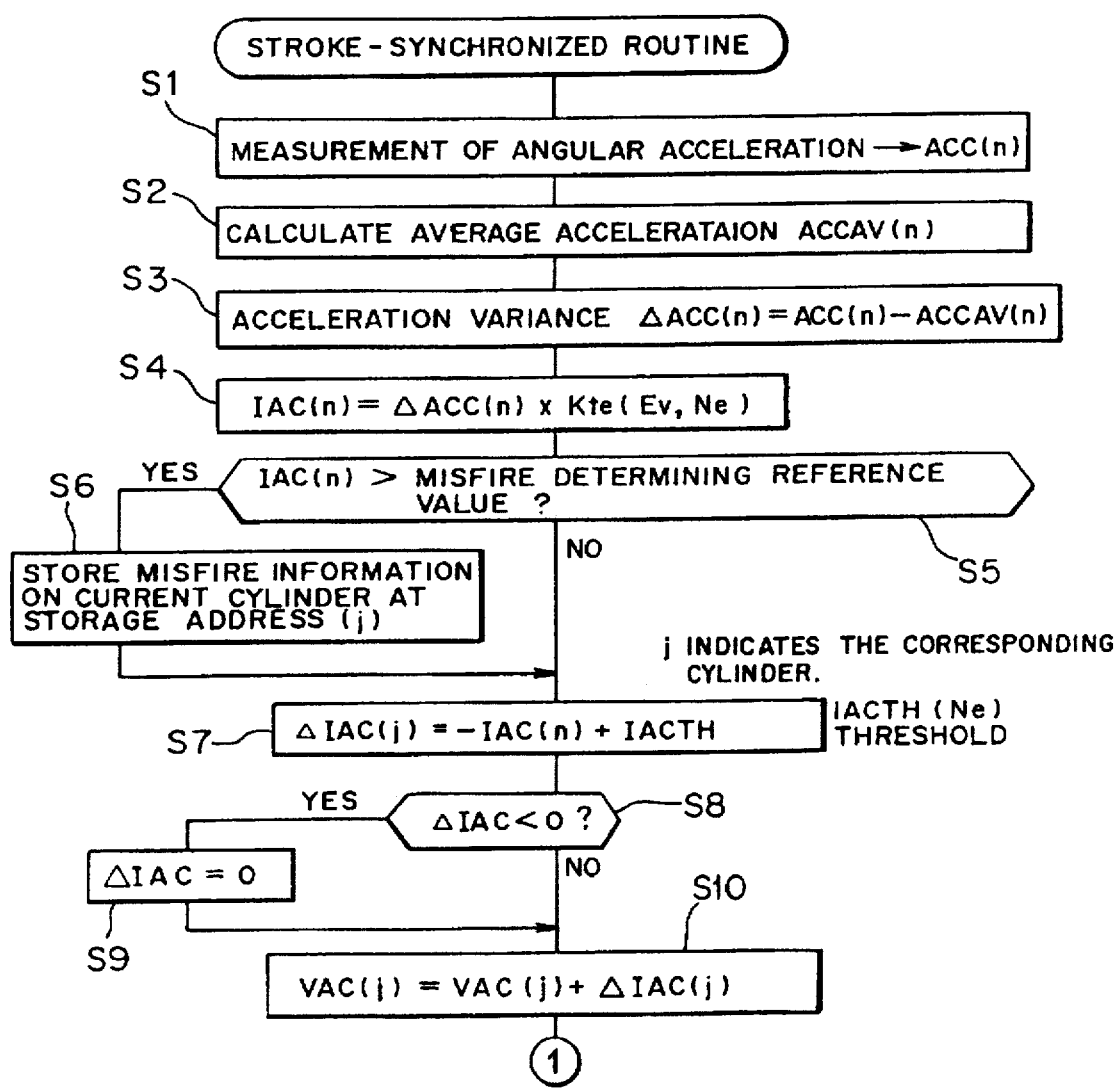
FIGS. 17 through 20 are flow charts for explaining operations of the system of FIG. 15, respectively.

Also provided are, as is depicted in FIG. 16, revolution variance detection means 207, lean-burn combustion limit operating means 208, and fuel injection quantity changing means 210.

In addition, ECU 25 is also provided, as shown in FIG. 16, with functions of the combustion state controlling means 105, the combustion variance adjusting element 106, the smoothing means 108A, the threshold updating means 110 and the misfire determining reference value 111.

Here, the combustion variance adjusting element 106 is to adjust a fuel injection pulse width Tinj to a desired state by a control signal from the combustion state controlling means 105 so that a lean-burn operation is performed at an air/fuel ratio which is supposed to be achieved. The injector 9 functions as the combustion variance adjusting element 106.

Incidentally, the fuel injection pulse width Tinj is expressed by the following formula:

$$Tinj(j)=TB \cdot KAC(j) \cdot K \cdot KAFL+Td \quad (2-1)$$

TB in the above formula means a basic drive time of the injector 9. From information on an inducted air quantity A from the air flow sensor 17 and information on an engine speed N from the crank angle sensor (engine speed sensor) 24, information on an inducted air quantity A/N per engine revolution is obtained and based on this information, the basic drive time TB is determined.

On the other hand, KAFL is a leaning correction coefficient and from characteristics stored in a map, is determined corresponding to an operation state of the engine. The air/fuel ratio can therefore be made lean or stoichiometric depending on the operation state.

KAC(j) is, as will be described subsequently herein, an air/fuel ratio changing data (correction coefficient) for performing combustion state control in correspondence to variance in combustion.

Further, the correction coefficient K is set in accordance with the engine coolant temperature, the inducted air temperature, the atmospheric pressure and the like. By the dead time (invalid time) Td, the drive time is corrected according to the battery voltage.

It is also designed to perform a lean-burn operation when predetermined conditions are found to be met by lean operation condition determining means.

Accordingly, ECU 25 has the function of air/fuel ratio controlling means which controls the air/fuel ratio to have an air/fuel ratio on a side leaner than a stoichiometric air/fuel ratio under predetermined operation conditions.

Incidentally, the combustion state controlling system according to this embodiment is also equipped with the angular acceleration detecting means 107 which detects an angular acceleration of the rotating shaft (crankshaft) driven by the engine. The construction of the angular acceleration detecting means 107 is as described above.

Incidentally, to practice the method of this embodiment for coping with a rough road in a vehicle with a lean-burn internal combustion engine mounted thereon, the engine combustion state controlling system is provided with the revolution variance detection means 101 which detects a variance value in angular acceleration by using a detection signal from the angular acceleration detecting means 107.

The computation by the revolution variance detection means 101 is conducted by determining the difference between a smoothed value, which has been obtained by smoothing a detected angular velocity by the smoothing means 108A, and an angular acceleration outputted from the angular acceleration detecting means 107.

Namely, at the variance detection means 101, an acceleration variance value $\Delta ACC(n)$ is calculated by the following formula:

$$\Delta ACC(n)=ACC(n)-ACCAV(n) \quad (2-2)$$

Here, ACCAV(n) is the smoothed value obtained by smoothing the detected angular velocity by the smoothing means 108 and is calculated by conducting a primary filtering processing in accordance with the following formula:

$$ACCAV(n)=\alpha \times ACCAV(n-1)+(1-\alpha) \times ACC(n) \quad (2-3)$$

where $\alpha$ is an updating gain in the primary filtering processing and takes a value of 0.95 or so.

Also provided is the combustion-state-indicating data calculating means 103 for normalizing the variance value $\Delta ACC(n)$, which has been outputted from the revolution variance detection means 101, in accordance with the state of operation of the engine to obtain a combustion-state-indicating data IAC(n).

The calculation of the combustion-state-indicating data IAC(n) at the combustion-state-indicating data calculating means 103 is conducted in accordance with the following formula:

$$IAC(n)=\Delta ACC(n) \times Kte(Ev,Ne) \quad (2-4)$$

where Kte(Ev,Ne) is an output correction coefficient and is set by the above-described characteristics shown in FIG. 12.

The characteristic of FIG. 12 are illustrated by plotting volumetric efficiencies Ev along the abscissa and output correction coefficients Kte(Ev,Ne), which correspond to the volumetric efficiencies Ev, along the ordinate, and the characteristics of a curve on a more upper right side are adopted as the engine speed Ne becomes higher.

Accordingly, the characteristics of FIG. 12 are stored as a map. From the engine speed Ne calculated from the detection signal of the crank angle sensor 24 or the like and the volumetric efficiency Ev, the output correction coefficient Kte(Ev,Ne) set at ECU 25, so that normalization is performed by a correction corresponding to an engine output.

Also provided is the combustion-determining data detecting means 108, which compares the combustion state indicating data IAC(n) with the predetermined threshold IACTH to determine the combustion-determining data VAC(j). This combustion determining data VAC(j) is obtained by cumulating the quantities of deteriorations in each of which the combustion state indicating data IAC(n) is smaller by the corresponding deterioration quantity than the threshold IACTH.

Namely, the combustion determining data VAC(j) is calculated by the following formula:

$$VAC(j)=\Sigma\{IAC(j)<IACTH\}\times\{IACTH-IAC(j)\} \qquad (2\text{-}5)$$

In the above formula, $\{IAC(j)<IACTH\}$ is a function which stands for "1" when IAC(j)<IACTH is met but for "0" when this condition is not met. When each normalized variance value IAC(n) is smaller than the predetermined threshold IACTH, this negative difference is cumulated as a deterioration quantity.

Accordingly, the combustion determining data VAC(j) is obtained by cumulating each quantity of deterioration which is weighted by the difference between the threshold IACTH and the combustion state indicating data IAC(j), so that effects of values around the threshold can be made smaller to precisely reflect the state of deterioration.

Further, the predetermined threshold IACTH in said combustion determining data detecting means 108 is updated corresponding to the state of operation of the engine by the threshold updating means 110.

Incidentally, the above-described suffix "j" indicates the number of each cylinder.

As an alternative, the combustion determining data VAC(j) may also be determined by using a simpler program and cumulatively counting the number of detections in each of which the combustion state indicating data IAC(n) is smaller than the threshold IACTH (namely, $VAC(j)=\Sigma\{IAC(j)<IACTH\}$).

Computation results from the combustion determining data detecting means 108, such as those described above, are employed at the combustion state controlling means 105.

Namely, referring to the combustion determining data VAC(j) calculated by the combustion determining data detecting means 108, the combustion state controlling means 105 controls the combustion variance adjusting element 106 of the engine by the thus-calculated air/fuel ratio changing data KAC(j).

As the reference values for the control of the combustion variance adjusting element 106 by the combustion state controlling means 105, are provided an upper limit reference value (VACTH1) set by upper limit reference value setting means 112U and an lower limit reference value (VACTH2) set by upper limit reference value setting means 112L.

The control by the combustion variance adjusting element 106 is performed so that the combustion determining data VAC(j) falls between the upper limit reference value (VACTH1) and the lower limit reference value (VACTH2).

More specifically, the control by the combustion variance adjusting element 106 is performed by correcting the basic injection pulse width upon injection of fuel as described above. The injection pulse width Tinj(j) is calculated in accordance with the following formula:

$$Tinj(j)=TB\times KAC(j)\times K\times KAFL+Td \qquad (2\text{-}6)$$

Further, the correction coefficient changing data KAC(j) in the above formula can be adjusted as will be described next.

First, where the combustion determining data VAC(j) is greater than the upper limit reference value VACTH1, the combustion variance value is taken as having deteriorated to or beyond the predetermined level. An enriching correction for increasing the fuel injection quantity is therefore performed by calculating the air/fuel ratio changing data KAC(j) in accordance with the following formula:

$$KAC(j)=KAC(j)+KAR\cdot\{VAC(j)-VACTH1\} \qquad (2\text{-}7)$$

This is to calculate the correction value of the rich-side upper right characteristics among the correction characteristics shown in FIG. 9, and KAR is a coefficient indicating the gradient of the characteristics. KAC(j) on the right side indicates an air/fuel ratio changing data calculated in the preceding computation cycle (n−1) with respect to the cylinder numbered j and is updated according to the above formula.

FIG. 9 shows correction characteristics by plotting combustion determining data VAC along the abscissa and air/fuel ratio changing data KAC along the ordinate.

On the other hand, where the combustion determining data VAC(j) is smaller than the lower limit reference value VACTH2, the combustion is taken as permitting further leaning so that a leaning correction for reducing the fuel injection quantity is performed by calculating an air/fuel ratio changing data KAC(j) in accordance with the following formula:

$$KAC(j)=KAC(j)-KAL\cdot\{VAC(j)-VACTH2\} \qquad (2\text{-}8)$$

This is to calculate the correction value of the lean-side lower left characteristics shown in FIG. 9, and KAL is a coefficient indicating the gradient of the characteristics.

Further, where the combustion determining data VAC(j) is equal to or greater than the lower limit reference value VACTH2 but is equal to or smaller than the upper limit reference value VACTH1, the engine is taken as being in an adequate operation state so that no change is made to the air/fuel ratio changing data KAC(j) to maintain the fuel injection quantity in the preceding state.

This corresponds to horizontal characteristics between the lean-side lower left characteristics and the rich-side upper right characteristics shown in FIG. 9, and forms a dead zone for corrections.

Here, the lower limit reference value VACTH2 and the upper limit reference value VACTH1 are set with a combustion variance target value VACO located at the center therebetween, that is, the lower limit reference value VACTH2 is set at the value of (VACO−ΔVAC) and the upper limit reference value VACTH1 at the value (VACO+ΔVAC).

The combustion variance target value VACO is a value corresponding to a target value (10% or so) of COV (coefficient of variance). By preventing any fuel correction within the range of ΔVAC on both sides of the combustion variance target value VACO, it is possible to avoid a limit cycle which would otherwise be caused by an error due to evaluation of rotational variance within a limited period (128 cycles) or due to computation based on a value smaller than the threshold.

The above-described air/fuel ratio changing data KAC(j) is designed to be clipped at both upper and lower limits and is set to meet, for example, the following inequality: 0.85<KAC(j)<1.1. The correction coefficient is therefore set to avoid any abrupt correction and to gradually perform a correction so that occurrence of a shock or the like can be prevented and the control can be performed stably.

Further, the combustion determining data VAC(j) can be updated every preset number of combustions, for example, every 128 (or 256) cycles. By performing the control while ascertaining the state of combustion over a relative long period, the control can be performed stably and surely while reflecting statistical characteristics.

The misfire determining reference value is set on a combustion deteriorated side of the reference value set by the reference value setting means 112. Based on a change in the combustion state indicating data IAC(n) toward the combustion deteriorated side beyond the misfire determining reference value, a misfire is determined, information on the misfire is stored at a misfire information address (j) for the current cylinder, and control is performed for the misfire.

More specifically, the control by the combustion variance adjusting element 106 is performed by correcting the basic injection pulse width upon injection of fuel as described above. The injection pulse width Tinj(j) is calculated in accordance with the following formula:

$$Tinj(j) = TB \times KAC(j) \times K \times KAFL + Td \quad (2\text{-}9)$$

Further, the air/fuel ratio changing data KAC(j) in the above formula can be adjusted in accordance with the following formula:

$$KAC(j) = KAC(j) + ZFCPAL \cdot \{VAC(j) - VACO\} \quad (2\text{-}10)$$

This is to calculate the correction value of the rich-side upper right characteristics among the correction characteristics shown in FIG. 9, and ZFCPAL is a coefficient indicating the gradient of the characteristics. KAC(j) on the right side indicates an air/fuel ratio changing data calculated in the preceding computation cycle (n−1) with respect to the cylinder numbered j and is updated according to the above formula.

FIG. 9 shows correction characteristics by plotting combustion determining data VAC along the abscissa and air/fuel ratio changing data KAC along the ordinate.

On the other hand, when a case in which the combustion state indicating data IAC(n) is smaller than the threshold IACTH occurs less than once in 128 cycles, the combustion is taken as permitting further leaning so that a leaning correction for reducing the fuel injection quantity is performed by calculating an air/fuel ratio changing data KAC(j) in accordance with the following formula:

$$KAC(j) = KAC(j) - ZFCPAL \cdot \{VAC(j) - VACO\} \quad (2\text{-}11)$$

This is to calculate the correction value of the lean-side lower left characteristics shown in FIG. 9, and ZFCPAL is a coefficient indicating the gradient of the characteristics.

Further, when a case in which the combustion state indicating data IAC(n) is smaller than the threshold IACTH occurs 1–2 times in 128 cycles, the engine is taken as being in an adequate operation state so that no change is made to the air/fuel ratio changing data KAC(j) to maintain the fuel injection quantity in the preceding state.

This corresponds to horizontal characteristics between the lean-side lower left characteristics and the rich-side upper right characteristics shown in FIG. 9, and forms a dead zone for corrections.

The permissible variance value VACO is a value corresponding to a target value (10% or so) of COY (coefficient of variance). By preventing any fuel correction within the range of $\Delta$VAC on each side of the permissible variance value VACO, it is possible to avoid a limit cycle which would otherwise be caused by an error due to evaluation of rotational variance within a limited period (128 cycles) or due to computation based on a value smaller than the threshold.

The above-described air/fuel ratio changing data KAC(j) is designed to be clipped at both upper and lower limits and is set to meet, for example, the following inequality: $0.85 < KAC(j) < 1.1$. The correction coefficient is therefore set to avoid any abrupt correction and to gradually perform a correction so that occurrence of a shock or the like can be prevented and the control can be performed stably.

Further, the combustion determining value VAC(j) can be updated every preset number of combustions, for example, every 128 (or 256) cycles. By performing the control while ascertaining the state of combustion over a relative long period, the control can be performed stably and surely while reflecting statistical characteristics.

In this manner, the control is performed to slightly change the air/fuel ratio of the internal combustion engine, which is in operation in the vicinity of the lean-burn limit air/fuel ratio, toward the leaner side when the combustion is good but toward the richer side when the combustion has deteriorated, respectively.

In this embodiment, the logical determination value calculating means 235 is provided to logically determine the increase/decrease $\Delta$VAC of the combustion determining data VAC and also the increase/decrease $\Delta$KAC of the air/fuel ratio changing data KAC during the operation of the internal combustion engine in the vicinity of the lean-burn limit air/fuel ratio. In accordance with the results of calculations, it is determined or estimated at the logical determination means 236 in the rough-road-running determination means 202 whether the vehicle with the internal combustion engine mounted thereon is running on a rough road or not.

When either a case in which the combustion determining data VAC has changed to the combustion deteriorated side subsequent to a change of the air/fuel ratio changing data KAC toward the richer air/fuel ratio side or a case in which the combustion determining data VAC has changed toward the good combustion side subsequent to a change of the air/fuel ratio changing data KAC toward the leaner air/fuel ratio side continue or both of these cases continuously occur, the rough-road-running determination means 202 determines or estimate that the vehicle with the internal combustion engine mounted thereon is running on a rough road.

This embodiment is constructed so that a logical determination value SKV calculated by the logical determination value calculating means 235 is adopted as a rough road determining data. The logical determination value SKV is set as shown in Table 1 which is to be described subsequently herein. This value is designed to function as an integrated quantity of revolution variance correction effects when cumulated.

As a consequence, the logical determination value SKV increases in at least one of the case that the combustion determining data VAC has changed to the combustion deteriorated side subsequent to the change of the air/fuel ratio changing data KAC toward the richer air/fuel ratio side or the case that the combustion determining data VAC has changed toward the good combustion side subsequent to the change of the air/fuel ratio changing data KAC toward the leaner air/fuel ratio side, but the logical determination value SKV decreases in at least one of a case in which the combustion determining data VAC has changed to the good combustion side subsequent to a change of the air/fuel ratio changing data KAC toward the richer air/fuel ratio side or a case in which the combustion determining data VAC has changed toward the combustion deteriorated side subsequent to a change of the air/fuel ratio changing data KAC toward the leaner air/fuel ratio side.

Further, the vehicle is determined or estimated to be running on a rough road when the logical determination value SKV as the rough road determining data has become greater than a preset value (for example, 1.5).

Further, the combustion determining data VAC and the air/fuel ratio changing data KAC are detected with respect to each cylinder j. The vehicle is determined or estimated to be running on a rough road when logical determination between the increase/decrease ΔVAC of the combustion determining data VAC and the increase/decrease ΔKAC of the air/fuel ratio changing data KAC with respect to at least one cylinder indicate results corresponding to a rough-road-running state.

Besides the conditions of the results of the above-mentioned logical determination, the vehicle is also determined or estimated to be running on a rough road when, with respect to plural ones of the cylinders j, other rough-road-running conditions have been determined to be met by operation of the rough-road-running determination means 238 and the rough-road-state-count determining means 237 on combustion state indicating data.

Namely, the vehicle is determined to be running on a rough road on the basis of a departure of the combustion state indicating data IAC from the predetermined range, which is set by the upper limit ITHHI and the lower limit ITHLO, upon determination by the rough-road-running determination means 238 on the basis of the combustion state indicating data.

Further, the vehicle is also determined to be running on a rough road on the basis of occurrence of a state (count NAC), in which the combustion state indicating data IAC becomes greater than the upper limit ITHHI, as many times as at least a first predetermined count N11 during a predetermined sampling period and also of occurrence of a state (count NDET), in which the combustion state indicating data IAC becomes smaller than the lower limit ITHLO, as many times as at least a second predetermined count N2.

Owing to the provision of the air/fuel ratio changing data updating means 239 and the updating stop means 240, the updating of the air/fuel ratio changing data KAC is terminated when the vehicle is determined to be running on a rough road by the rough-road-running determination means 202, but the updating of the air/fuel ratio changing data KAC is resumed upon detection of ending of the running on the rough road during the termination of the updating of the air/fuel ratio changing data KAC.

Owing to the provision of the lean-burn limit air/fuel ratio vicinity operating means 241 and the lean-burn limit air/fuel ratio vicinity operation prohibiting means 242, operations of these means prohibit operation in the vicinity of the lean-burn limit air/fuel ratio to operate the internal combustion engine at an air/fuel ratio on the richer side when the vehicle is determined to be running on a rough road by the rough-road-running determination means 202, but resume the operation in the vicinity of the lean-burn limit air/fuel ratio upon detection of ending of the running on the rough road during the prohibition of the operation in the vicinity of the lean-burn limit air/fuel ratio.

In this manner, the increase/decrease ΔKAC of the air/fuel ratio changing data KAC as a fuel correction coefficient and the increase/decrease ΔVAC of the combustion state indicating data IAC as a revolution deterioration index are compared with each other to logically determine whether the vehicle is running on a rough road or not.

Further, detection of a rough road by the rough-road-running determination means 202 is also performed during a stoichiometric operation so that no lean operation is permitted by the lean-burn limit air/fuel ratio vicinity operation prohibiting means 242 until the road becomes no longer rough.

Owing to the setting of the misfire determining reference value, a misfire is determined based on a change of the combustion state indicating data IAC(n) toward the combustion deteriorated side beyond the misfire determining reference value and information on the misfire is stored in the misfire information address (j) for the currency cylinder, whereby control is performed for the misfire.

Since the control system for practicing the method according to the second embodiment of the present invention for coping with a rough road in a vehicle with a lean-burn internal combustion engine mounted thereon is constructed as described above, the operations illustrated the flow charts of FIGS. 17 through 20 are successively performed.

In step S1, an angular acceleration ACC(n) is first detected by the angular acceleration detecting means 107.

Here, computation employed for the detection is performed in accordance with the following formula:

$$ACC(n) = 1/TN(n) \cdot \{KL(m)/TN(n) - KL(m-1)/TN(n-1)\} \quad (2\text{-}12)$$

where KL(m) is a segment correction value. To perform correction with respect to the currently identified cylinder so that any error in the measurement of the period due to variations in the angular intervals of the vanes caused upon fabrication and mounting of the vanes can be eliminated, a segment correction value KL(m) is calculated in accordance with the following formula:

$$KL(m) = \{KL(m-3) \times (1 - XMFDKFG) + KR(n) \times (XMFDKFD)\} \quad (2\text{-}13)$$

where XMFDKFG represents a segment correction value gain.

On the other hand, KR(n) in the above formula is determined in accordance with the following formula:

$$KR(n) = 3 \cdot TN(n)/\{TN(n) + TN(n-1) + TN(n-2)\} \quad (2\text{-}14)$$

This is a measurement value corresponding to an average measurement time period from the measurement time period TN(n-2) of the two measurements ago until the measurement time period TN(n) of the current measurement. Upon calculation of the segment correction value KL(m), the primary filtering processing by the segment correction value gain XMFDKFG is performed by using the above-described formula.

An average acceleration ACCAV(n) is then calculated in step S2.

Here, ACCAV(n) is the smoothed value obtained by smoothing the detected angular velocity ACC(n) by the smoothing means 108 and is calculated by conducting a primary filtering processing in accordance with the following formula:

$$ACCAV(n) = \alpha \cdot ACCAV(n-1) + (1-\alpha) \cdot ACC(n) \quad (2\text{-}15)$$

where α is an updating gain in the primary filtering processing and takes a value of 0.95 or so.

In step S3, an acceleration variance value ΔACC(n) is next detected by the revolution variance detection means 101.

Namely, by determining the difference between the angular velocity ACC(n) detected by the angular acceleration detection means 107 and the average acceleration ACCAV (n) as the smoothed value obtained by smoothing by the smoothing means 108, an acceleration variance value ΔACC (n) is calculated in accordance with the following formula:

$$\Delta ACC(n) = ACC(n) - ACCAV(n) \qquad (2\text{-}16)$$

In step S4, a combustion state indicating data IAC(n), which has been obtained by normalizing a variance value $\Delta ACC(n)$ outputted from the revolution variance detection means 101 in accordance with the state of operation of the engine, is calculated by the combustion-state-indicating data calculating means 103 in accordance with the following formula:

$$IAC(n) = \Delta ACC(n) \cdot Kte(Ev,Ne) \qquad (2\text{-}17)$$

where Kte(Ev,Ne) is an output correction coefficient and is set by the characteristics shown in FIG. 12.

The characteristic of FIG. 12 are illustrated by plotting volumetric efficiencies Ev along the abscissa and output correction coefficients Kte(Ev,Ne), which correspond to the volumetric efficiencies Ev, along the ordinate, and the characteristics of a curve on a more upper right side are adopted as the engine speed Ne becomes higher.

In the characteristics of FIG. 12 stored as a map, the output correction coefficient Kte(Ev,Ne) is set at ECU 25 from the engine speed Ne calculated from the detection signal of the crank angle sensor 220 or the like and the volumetric efficiency Ev, so that normalization is performed by correction corresponding to an engine output.

Here, a description will be made of control characteristics where normalization is conducted corresponding to an engine output as described above.

Namely, an angular acceleration $\omega'$ is expressed as shown by the following formula:

$$\omega' = 1/Ie \cdot (Te - Tl) \qquad (2\text{-}18)$$

where Te is an engine torque, Tl is a load torque, and Ie is a moment of inertia.

On the other hand, $$\omega' = \omega_o' + \Delta\omega' \qquad (2\text{-}19)$$

where $\omega_o'$ is an average angular acceleration.

From formulae (2-18) and (2-19), $$\begin{aligned} \omega_o' + \Delta\omega' &= 1/Ie \cdot (Te - Tl) \\ &= 1/Ie \cdot (Te_o - Tl) + \Delta Te/Ie \\ \text{Hence, } \Delta\omega' &= \Delta Te/Ie \end{aligned} \qquad (2\text{-}20)$$

Incidentally, according to the above-described detection method of the angular acceleration ACC(n) in step S1, engine torque information is stored relatively well where no load disturbance exists. Further, as is indicated by formula (2-20), by conducting the control while using a variance $\Delta\omega'$ from the average angular acceleration $\omega_o'$ [acceleration variance value $\Delta ACC(n)$] and the normalized output taking the moment of inertia Ie into account [combustion state indicating data IAC(n)], the control can be performed while taking into account the statistical nature of combustion variance and surely reflecting the combustion variance.

After the operation of step S4 has been performed, determination of a misfire is then performed in step S5.

Namely, it is determined whether or not the combustion state indicating data IAC(n) has changed toward the combustion deteriorated side beyond the misfire determining reference value set by the misfire determining reference value setting means 111. If determined to have changed, it is determined that a misfire has occurred.

If this determination has been made, step S6 is performed to store information on the misfire at the misfire information address (j) for the current cylinder so that control for the misfire is performed.

On the other hand, if no misfire has been determined or after step S6 has been performed subsequent to determination of a misfire, operations by the combustion-determining data detecting means 108 are performed as shown in step S7 to step S10, whereby the combustion state indicating data IAC(n) and the predetermined threshold IACTH are compared and a combustion determining data VAC(j) is calculated in accordance with the following formula:

$$VAC(j) = \Sigma\{IAC(j) < IACTH\} \times \{IACTH - IAC(j)\} \qquad (2\text{-}21)$$

In step S7, the difference $\Delta IAC(n)$ between the combustion state indicating data IAC(n) and the predetermined threshold IACTH is first calculated and in step S8, it is then determined whether the difference $\Delta IAC(n)$ is negative or not.

This determination corresponds to the function $\{IAC(j) < IACTH\}$ in the above formula, and an operation is performed to take "1" when IAC(j)<IACTH is met but "0" when this condition is not met.

Namely, when IAC(j)<IACTH is met, $\Delta IAC(n)$ is positive. The routine then advances through the "NO" route and cumulation of the combustion determining data VAC(j) in step S10 is performed, resulting in the state that the above-described function takes "1".

When IAC(j)<IACTH is not met, on the other hand, $\Delta IAC(n)$ is negative. The routine then advances through the "YES" route and $\Delta IAC(n)=0$ is performed in step S9. As a consequence, no cumulation of the combustion determining data VAC(j) is performed in step S10, resulting in the state that the above-described function takes "0".

Accordingly, when the combustion state indicating data IAC(n) is smaller than the predetermined threshold IACTH as indicated by the dots a to d in FIG. 10, these negative differences are cumulated as deterioration quantities.

Accordingly, the combustion determining data VAC(j) is obtained by cumulating each deterioration quantity which is weighted by the difference between the threshold IACTH and the combustion state indicating data IAC(j), so that effects of values around the threshold can be minimized to precisely reflect the state of deterioration in the combustion determining data VAC(j).

Further, the predetermined threshold IACTH in the combustion-determining data detecting means 108 is updated corresponding to the state of operation of the engine by the threshold updating means 110, thereby making it possible to realize an operation state still closer to the lean limit.

Incidentally, the above-described suffix "j" indicates the number of each cylinder. The combustion determining data VAC(j) is cumulated with resect to each cylinder J.

In this manner, the combustion state indicating data IAC(n) and the combustion determining data VAC(j) are calculated in every computation cycle.

Figure 18:
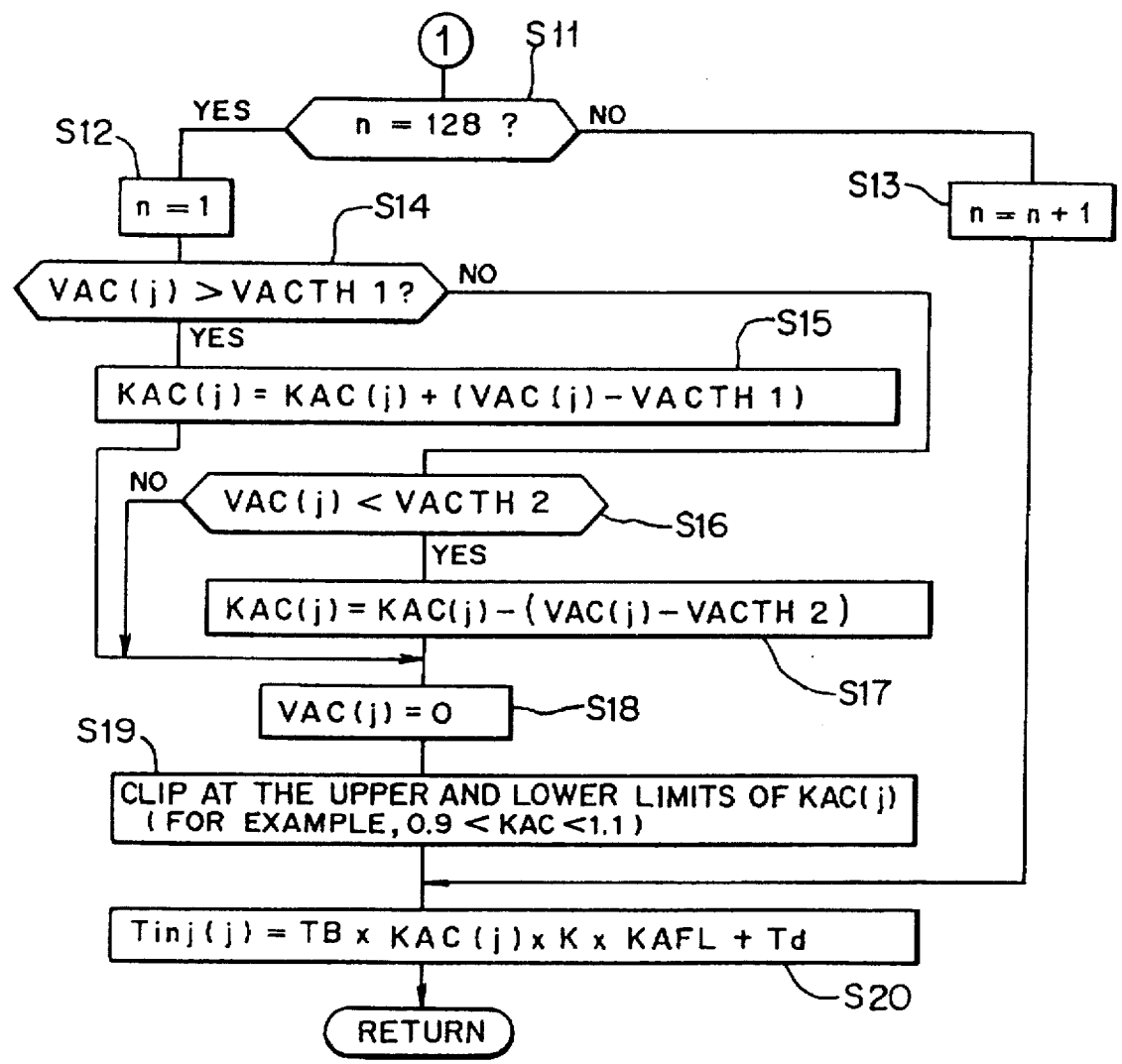

Next, operations will be performed in accordance with the flow chart shown in FIG. 18. First, step S11 is performed to determine whether n, which indicates the number of samplings, has exceeded 128 or not.

In other words, it is determined whether or not the integrating range shown in FIG. 10 has been gone through. If not, the routine advances through the "NO" route and step S13 is performed to increase the number n by "1", whereby step S20 is performed without conducting any fuel correction. As a consequence, in the integrating range of 128 cycles, the correction by the air/fuel ratio changing data KAC(j) to the injection pulse width Tinj is not performed and cumulation of the combustion determining data VAC(j) is performed primarily.

Accordingly, the combustion determining data VAC(j) is updated an every preset number of combustions, for example, every 128 cycles. By conducting control while ascertaining the state of combustion over a relatively long period, the control can be performed stably and surely while reflecting statistical characteristics.

Upon an elapse of the integrating period, the routine advances through the "YES" route from step S11 and step S12 to step S18 are performed.

First, the number n is reset to "1" in step S12. Then, in step S14 and step S15, the combustion determining data VAC(j) is referred to and is compared with the predetermined reference value set by the reference value setting means 112.

Figure 11:
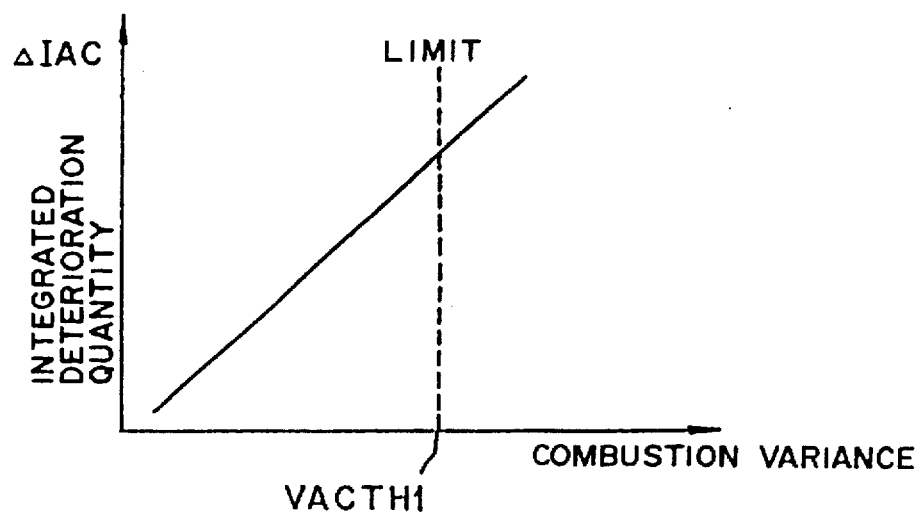
FIG. 11 is a schematic graph for explaining the operation of the system of FIG. 1.

First, the comparison between the combustion determining data VAC(j) and the upper limit reference value (VACTH1) is performed. When the combustion determining data VAC(j) is greater than the upper limit reference value VACTH1, namely, when the deterioration quantity of combustion variance is greater than the upper limit reference value VACTH1 as shown in FIG. 11, calculation of the air/fuel ratio changing data KAC(j) is performed in step S15.

$$KAC(j)=KAC(j)+KAR \cdot \{VAC(j)-VACTH1\} \qquad (2\text{-}22)$$

This is to calculate the correction value of the rich-side upper right characteristics shown in FIG. 9. Taking the combustion variance value as having deteriorated to or beyond the predetermined level, an enriching correction for increasing the fuel injection quantity is performed by calculating the air/fuel ratio changing data KAC(j).

Here, KAR is a coefficient indicating the gradient of the characteristics. KAC(j) on the right side indicates the air/fuel ratio changing data calculated in the preceding computation cycle (n−1) and is updated according to the above formula.

On the other hand, where the combustion determining data VAC(j) is smaller than the lower limit reference value VACTH2, the routine advances through the "YES" route after step S16, and the combustion is taken as permitting further leaning so that a leaning correction for reducing the fuel injection quantity is performed by calculating an air/fuel ratio changing data KAC(j) in accordance with the following formula (step S17):

$$KAC(j)=KAC(j)-KAL \cdot \{VAC(j)-VACTH2\} \qquad (2\text{-}23)$$

This is to calculate the correction value of the lean-side lower left characteristics shown in FIG. 9, and KAL is a coefficient indicating the gradient of the characteristics.

Further, where the combustion determining data VAC(j) is equal to or greater than the lower limit reference value VACTH2 but is equal to or smaller than the upper limit reference value VACTH1, the routine advances through the "NO" route after both step S14 and step S15. The engine is taken as being in an adequate operation state so that no change is made to the air/fuel ratio changing data KAC(j) to maintain the fuel injection quantity in the preceding state.

This corresponds to the horizontal characteristics between the lean-side lower left characteristics and the rich-side upper right characteristics shown in FIG. 9, and forms a dead zone for corrections.

Here, the lower limit reference value VACTH2 and the upper limit reference value VACTH1 are set with the combustion variance target value VACO located at the center therebetween, that is, the lower limit reference value VACTH2 is set at the value of (VACO−ΔVAC) and the upper limit reference value VACTH1 at the value (VACO+ΔVAC).

The combustion variance target value VACO is a value corresponding to the target value (10% or so) of COV (coefficient of variance). By preventing any fuel correction within the range of ΔVAC on each side of the combustion variance target value VACO, it is possible to avoid a limit cycle which would otherwise be caused by an error due to evaluation of rotational within the limited period (128 cycles) or due to computation based on a value smaller than the threshold.

Step S18 is then performed to reset the combustion determining data VAC(j) at "0".

Further, if the air/fuel ratio changing data KAC(j) is greater or smaller than the upper or lower limit value in step S19, the air/fuel ratio changing data is clipped at the limit value on the corresponding side. If KAC(j) is set to fall, for example, within the range of 0.85<KAC(j)<1.1, the air/fuel ratio changing data is set at 1.1 when the value calculated in step S15 exceeds 1.1 while the air/fuel ratio changing data is set at 0.85 when the value calculated in step S16 is smaller than 0.85.

By gradually conducting correction without conducting any abrupt correction as described above, occurrence of a shock or the like can be prevented and the control can be performed stably.

In step S20, the correction to the basic injection pulse width by the air/fuel ratio changing data KAC(j) determined as described above is then performed.

Namely, the injection pulse width Tinj(j) is calculated in accordance with the following formula:

$$Tinj(j)=TB \cdot KAC(j) \cdot K \cdot KAFL+Td \qquad (2\text{-}24)$$

By this correction to the basic injection pulse width, the control of the combustion variance adjusting element 106 by the combustion state controlling means 105 is performed so that the engine is maintained in the desired lean limit operation state. Incidentally, control of the ERG quantity can also be considered as a combustion adjusting element.

The air/fuel ratio changing data KAC(j) is calculated as described above and the combustion variance adjusting element 106 as the fuel injection quantity adjusting means 210 is operated by the lean-burn limit operating means 208, whereby the fuel injection quantity is corrected in correspondence to the revolution variance.

Figure 19:
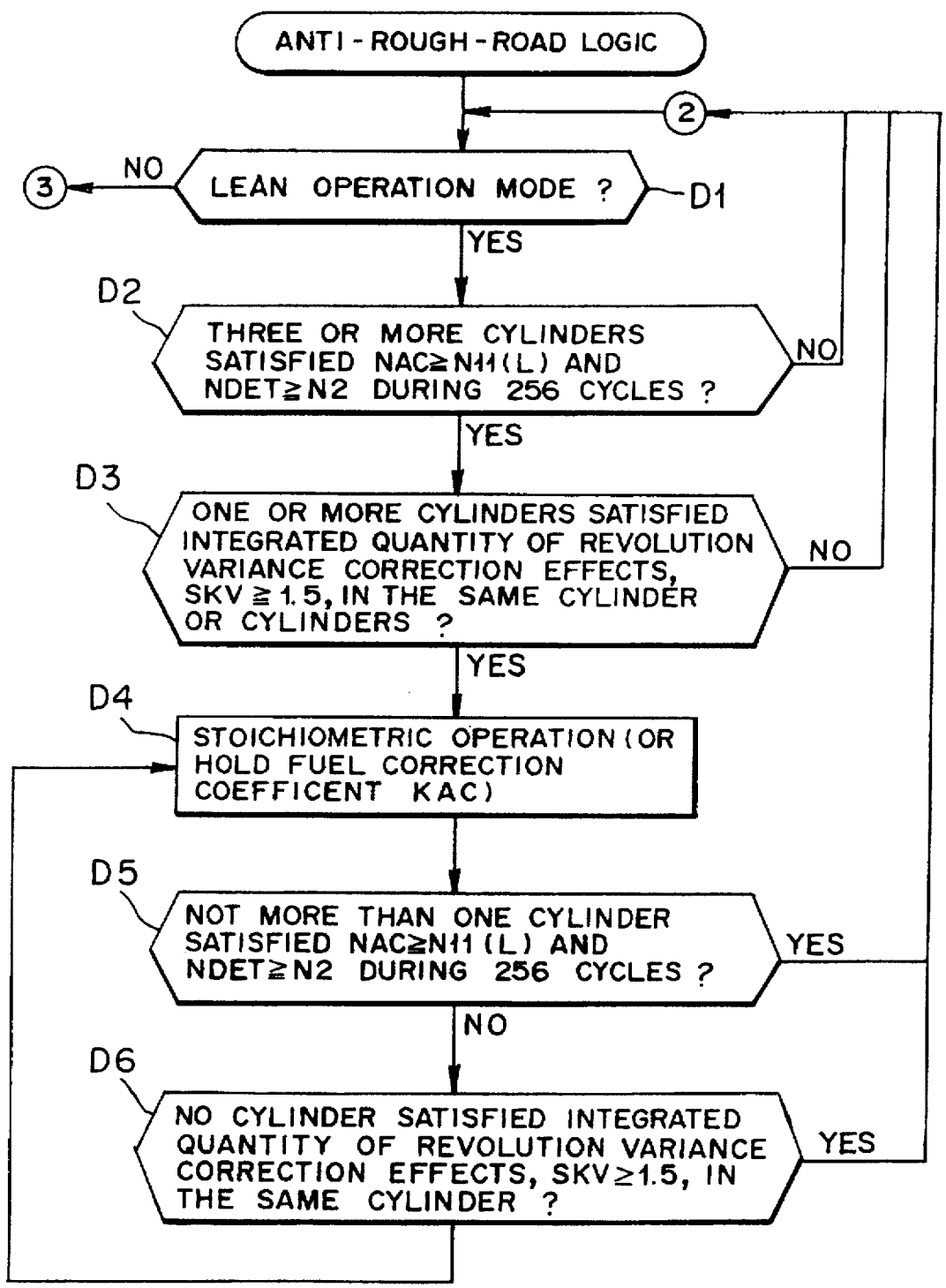
Figure 20:
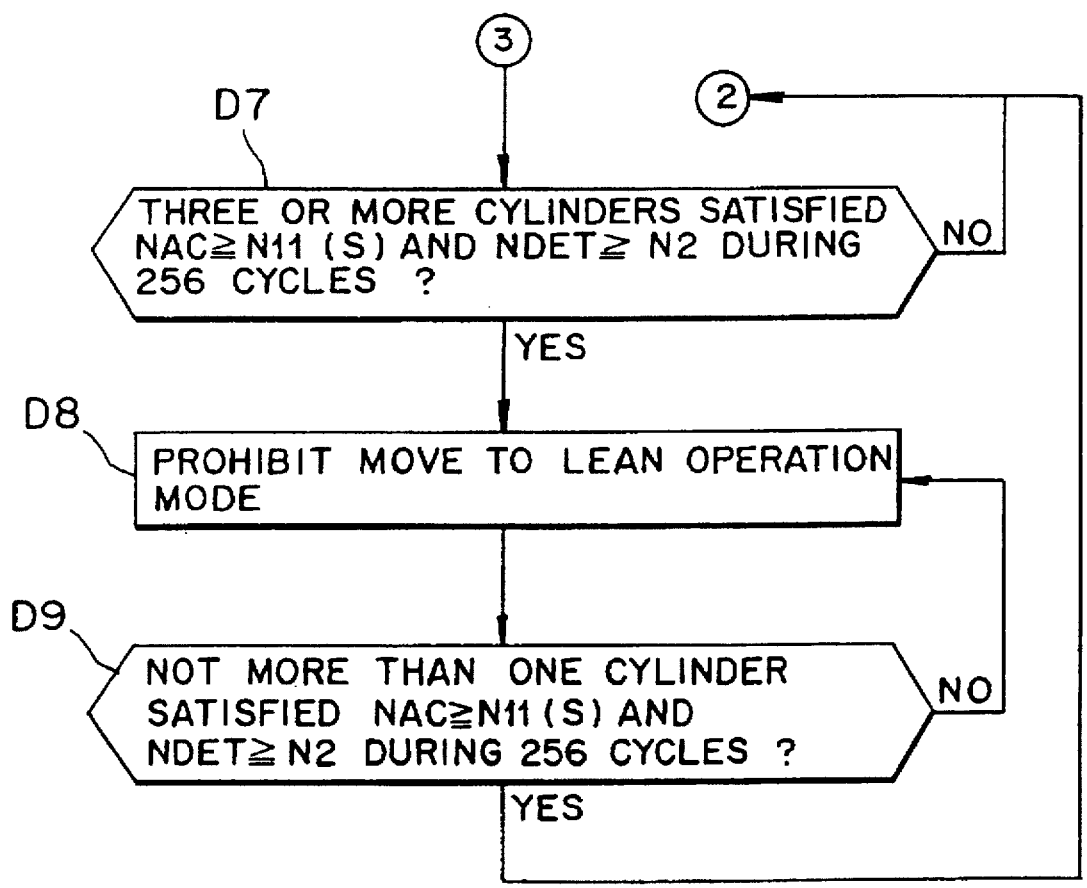

On the other hand, control under the anti-rough-road logic for rough-road running is conducted in accordance with the flow charts illustrated in FIGS. 19 and 20.

First, it is determined in step D1 whether the control mode is a lean operation mode or not. When it is in the lean operation mode, the routine advances along the "YES" route and step D2 is then performed.

In step D2, by operations of the rough-road-running determination means 238 and the rough-road-state-count determination means 237 on a combustion state indicating data in the rough-road-running determination means 202, it is determined "whether or not there are three or more cylinders each of which satisfies the count NAC≧ the first predetermined count N11 and the count NDET≧ the second predetermined count N2 in 256 cycles".

Here, the count NAC is the number of cycles, in which a rough road has been determined, per cylinder during 128 cycles, is a count of cases in each of which the combustion state indicating data IAC exceeded the upper limit ITHHI as the rough-road-determining threshold, and is expressed as follows:

$$NAC=\Sigma(IAC>ITHHI) \qquad (2\text{-}25)$$

As a result, each state in which a revolution variance corresponds to running on a rough road is detected.

On the other hand, the count NDET is the number of cycles, in which combustion was deteriorated, per cylinder during 128 cycles, is a count of cases in each of which the combustion state indicating data IAC fell short of the lower limit ITHLO as the combustion deterioration determining threshold, and is expressed as follows:

$$NDET=\Sigma(IAC>ITHLO) \qquad (2\text{-}26)$$

As a result, each state in which the revolution variance corresponds to a deterioration in combustion is detected.

It is then determined at the rough-road-state-count determining means 237 whether or not the revolution variance state corresponds to running on a rough road.

Namely, it is determined whether or not there are three or more cylinders each of which satisfies the count NAC≧ the first predetermined count N11 and the count NDET≧ the second predetermined count N2 in 256 cycles. When this condition is met, the vehicle is determined to be running on a rough road so that the routine advances along the "YES" route and step D3 is performed.

When the condition is not satisfied, the routine advances along the "NO" route and returns to the initial processing through ②.

Incidentally, the upper limit ITHHL, the lower limit ITHLO, the first predetermined count N11 and the second predetermined count N2 have been stored beforehand in ECU 25.

In step D3, the operation by the logic determination means 236 is performed to determine whether or not the integrated quantity of revolution variance correction effect calculated as the logic determination value SKV by the logic determination value calculating means 235 is at least equal to a predetermined value (for example, 1.5).

Described specifically, the values in Table 1 are adopted as correction effects although the sum of correction effects per 128 cycles in the last three corrections is successively calculated as the logic determination value SKV.

TABLE 1

| ΔVAC | ΔKAC | | |
|---|---|---|---|
| | Increase (≧ KACO) | Small change | Decrease (≦ -KACO) |
| Increase (≧ VACO) | 1.0 | 0.5 | -1.0 |
| Small change | 0.25 | 0 | 0.25 |
| Decrease (≦ -VACO) | -1.0 | 0.5 | 1.0 |

Here, the values of the correction effects in Table 1 are set as will be described next.

When the combustion determining data VAC has changed toward the combustion deteriorated side (namely, an increase in ΔVAC, that is, ΔVAC≧ the predetermined value VACO) in response to a change of the air/fuel ratio changing data KAC toward the richer air/fuel ratio side (namely, an increase in ΔKAC, that is, ΔKAC≧ the predetermined value KACO), the correction effect is set at "1.0" and is increasingly cumulated.

Namely, the fuel injection correction toward the richer air/fuel ratio side has not contributed to an improvement in the combustion determining data VAC which indicates a revolution variance. There is accordingly a high chance that ΔVAC equal to or greater than the predetermined value was caused by rough-road running rather than a deterioration in combustion. It is therefore increasingly cumulated to the logical determination value SKV.

When the combustion determining data VAC has changed toward the good combustion side (namely, a decrease in ΔVAC, that is, ΔVAC≦ the predetermined value−VACO) in response to a change of the air/fuel ratio changing data KAC toward the leaner air/fuel ratio side (namely, a decrease in ΔKAC, that is, ΔKAC≦ the predetermined value−KACO), on the other hand, the correction effect is set at "1.0" and is increasingly cumulated.

Namely, the fuel injection correction toward the leaner air/fuel ratio side has not contributed to a deterioration in the combustion determining data VAC which indicates a revolution variance. There is accordingly a high chance that ΔVAC equal to or smaller than the predetermined value was caused by rough-road running rather than a deterioration in combustion. It is therefore increasingly cumulated to the logical determination value SKV.

Further, when the combustion determining data VAC has changed toward the good combustion side (namely, a decrease in ΔVAC, that is, ΔVAC≦ the predetermined value−VACO) in response to a change of the air/fuel ratio changing data KAC toward the richer air/fuel ratio side (namely, an increase in ΔKAC, that is, ΔKAC≧ the predetermined value KACO), the correction effect is set at "−1.0" and is decreasingly cumulated.

Namely, the fuel injection correction toward the leaner air/fuel ratio side has contributed to an improvement in the combustion determining data VAC which indicates a revolution variance. There is accordingly a high chance that ΔVAC equal to or smaller than the predetermined value was caused by an improvement in combustion. It is therefore decreasingly cumulated to the logical determination value SKV.

When the combustion determining data VAC has changed toward the combustion deteriorated side (namely, an increase in ΔVAC, that is, ΔVAC≧ the predetermined value VACO) in response to a change of the air/fuel ratio changing data KAC toward the leaner air/fuel ratio side (namely, a decrease in ΔKAC, that is, ΔKAC≦ the predetermined value−KACO), the correction effect is set at "−1.0" and is decreasingly cumulated.

Namely, the fuel injection correction toward the leaner air/fuel ratio side has contributed to a deterioration in the combustion determining data VAC which indicates a revolution variance. There is accordingly a high chance that ΔVAC equal to or greater than the predetermined value was caused by a deterioration in combustion. It is therefore decreasingly cumulated to the logical determination value SKV.

Incidentally, when ΔVAC and ΔKAC fall within the predetermined ranges, respectively, values "0.5", "0.25" and "0" are taken corresponding to the respective situations as shown in Table 1.

When one or more cylinders have "1.5" or greater as the logical determination value SKV cumulatively calculated as described above, the vehicle is determined to be running on a rough road so that the routine advances through the "YES" route and step D4 is performed.

When the condition is not satisfied, on the other hand, the routine advances through the "NO" route and the preceding lean operation is continued via ②.

Holding of a stoichiometric operation or the air/fuel ratio changing data KAC is then performed in step D4.

As a consequence, the updating of KAC by the air/fuel ratio changing data updating means 239 is stopped by the updating stop means 240 so that a stoichiometric operation is performed during a rough-road operation is designed so that the logical determination value SKV as the rough road determining data value decreases in at least one of.

During this stoichiometric operation, step D5 and step D6 are successively performed so that determining operations substantially similar to those in step D2 and step D3 are repeated.

Namely, in step D5, by operations of the rough-road-running determination means 238 and the rough-road-state-count determination means 237 on a combustion state indicating data in the rough-road-running determination means 202, it is determined "whether or not there is not greater than one cylinder which satisfies the count NAC≧ the first predetermined count N11 and the count NDET≧ the second predetermined count N2 in 256 cycles".

Here, the count NAC is the number of cycles, in which a rough road has been determined, per cylinder during 128 cycles, is a count of cases in each of which the combustion state indicating data IAC exceeded the upper limit ITHHI as the rough-road-determining threshold, and is expressed as follows:

$$NAC=\Sigma(IAC>ITHHI) \quad (2\text{-}27)$$

As a result, each state in which a revolution variance corresponds to running on a rough road is detected.

On the other hand, the count NDET is the number of cycles, in which combustion was deteriorated, per cylinder during 128 cycles, is a count of cases in each of which the combustion state indicating data IAC fell short of the lower limit ITHLO as the combustion deterioration determining threshold, and is expressed as follows:

$$NDET=\Sigma(IAC>ITHLO) \quad (2\text{-}28)$$

As a result, each state in which the revolution variance corresponds to a deterioration in combustion is detected.

It is then determined at the rough-road-state-count determining means 237 whether or not the revolution variance state corresponds to running on a rough road.

Namely, it is determined whether or not there is not more than one cylinder which satisfies the count NAC≧ the first predetermined count N11 and the count NDET≧ the second predetermined count N2 in 256 cycles. When this condition is met, rough-road running is determined to have ended so that the routine advances along the "YES" route and the lean operation is resumed via ②.

When the condition is not satisfied, the rough-road running is determined not to have ended so that the routine advances along the "NO" route and step D6 is performed.

Incidentally, the upper limit ITHHI, the lower limit ITHLO, the first predetermined count N11 and the second predetermined count N2 have been stored beforehand in ECU 25.

In step D6, the operation by the logic determination means 236 is performed to determine whether or not there is no longer any cylinder having at least a predetermined quantity (for example 1.5) as the integrated quantity of revolution variance correction effect calculated as the logic determination value SKV by the logic determination value calculating means 235.

Described specifically, the values in Table 1 are adopted as correction effects although the sum of correction effects per 128 cycles in the last three corrections is successively calculated as the logic determination value SKV.

When there is no longer any cylinder in which the integrated quantity of revolution variance correction effects in the same cylinder is a predetermined quantity (for example, 1.5) or greater, the rough-road running is determined to have ended. The routine then advances through the "YES" route and the lean operation is resumed via ②.

When the condition is not met, it is determined that the rough-road running has not ended. The routine then advances through the "NO" route, and step D4 is performed so that the stoichiometric operation is continued.

Incidentally, when the operation was determined not to be in the lean operation mode in step D1 and the routine has advanced through the "NO" route, steps D7 to D9 shown in FIG. 20 will be performed.

In this case the engine is in the stoichiometric operation state, and the determination in step D7 will be repeated in this operation state.

Step D7 is to perform an operation similar to the determination in step D2 described above. By operations of the rough-road-running determination means 238 and the rough-road-state-count determination means 237 on the combustion state indicating data, it is determined whether or not the vehicle is running on a rough road.

When the vehicle is not running on a rough road, the routine advances through the "NO" route and step D1 is performed via ②, whereby step D7 and step D1 are repeated until the control is changed to the lean operation mode at ECU 25.

When the vehicle has been determined to be running on a rough road in step D7, on the other hand, the routine will advance through the "YES" route to perform step D8.

In step D8, a change into the lean operation mode is prohibited by the lean-burn limit air/fuel ratio vicinity operation prohibiting means 242.

This makes it possible to realize a control embodiment in which the operation mode is not changed into the lean operation upon detection of a rough road during a stoichiometric operation.

Further, the prohibition of a change into the lean operation mode in step D8 is continued until the routine advances through the "YES" route in step D9.

Described specifically, an operation similar to that in the above-described step D5 is performed in step D9 to repeatedly determine whether a rough road has ended or not. When the rough road has not ended, the routine advances through the "NO" route and step D8 is then performed.

Accordingly, when the rough road becomes no longer detectable by operations of the rough-road-running determination means 238 and the rough-road-state-count determination means 237 on the combustion state indicating data, the routine advances through the "YES" route and via ②, processings are started from step D1.

In this manner, control is performed to cope with running on a rough road.

By these operations, the present embodiment bring about effects or advantages as will be described next.

(1) It becomes possible to surely correct differences in combustion variance limit among cylinders caused by variations in air/fuel ratio due to differences in injectors and the shapes of intake pipe and/or shifts in valve timing, so that the individual cylinders can all be set at combustion limits, respectively.

(2) Owing to the effect or advantage in the preceding item, the emission of NOx can be minimized.

(3) The detection and control of revolution variance in each cylinder can be performed by a single crank angle sensor, thereby making it possible to perform surer lean-burn control and a stoichiometric operation at low cost.

(4) No additional sensor is needed to cope with rough roads, thereby making it possible to perform a lean operation without raising the cost.

(5) It becomes possible to surely ascertain whether a revolution variance is caused by running on a rough road or due to a deterioration in combustion, thereby making it possible to surely perform control against a rough road. An improvement in gas mileage and a reduction in NOx emission, which rely upon a lean operation, and sure running conforming with a rough road can be both achieved without failure.

(c) Others

In the above-described embodiments, applications to lean-burn engines were described by way of example. The method according to the present invention for the determination of a rough road can be applied to ordinary engines which do not perform lean burn (engines which primarily perform operation at a stoichiometric air/fuel ratio).

In this application, determination of a misfire in an ordinary engine can obviously be used as determination of a rough road in the technique that the rough road is determined based on a variance in the revolutionary angular acceleration of a crankshaft (the technique to determine a deterioration in combustion, in other words, occurrence of a misfire on the basis of a drop in the angular acceleration of the crankshaft) or as determination of a rough road in control of a component on the side of a vehicle body.

Capability of Exploitation in Industry

As has been described above, this invention relates to a variety of controls on various automotive components such as the engine, transmission, power steering, suspensions and brakes. By determining what kind of road surface condition a road on which the automotive vehicle is running has, a parameter useful for changing over the control mode can be furnished. This parameter can be used for various controls with the road surface condition taken into consideration. Upon detection of a misfire or the like of the engine from the state of a revolution variance or the like of the engine, running on a rough road is accompanied by the problem that no accurate determination of the misfire is feasible, because information on the road surface is included in the state of a revolution variance. As this invention can overcome this problem, this invention is suited for use in various high-accuracy controllers for automotive vehicles while precisely reflecting determination of a misfire on the basis of the state of a revolution variance and also determination as to whether the vehicle is running on a rough road or not.

We claim:

1. A method for the determination of a rough road in a vehicle with a multi-cylinder internal combustion engine mounted thereon, comprising the steps of:

detecting any revolution variance occurring with respect to each cylinder in the multi-cylinder internal combustion engine when operated at an air/fuel ratio leaner than a stoichiometric air/fuel ratio, each of said revolution variance states indicating a deterioration in combustion, the detecting step including detecting an angular acceleration of a rotating shaft, which is driven by the multi-cylinder internal combustion engine, in each specific stroke of each cylinder, calculating, on the basis of the results of the detecting step, variance data relevant to any revolution variance of each cylinder accompanied with a deterioration in combustion during operation of the internal combustion engine at an air/fuel ratio leaner than a stoichiometric air/fuel ratio, operating the internal combustion engine in the vicinity of a lean burn limit air/fuel ratio on the basis of the results of the calculating step, and determining or estimating that said vehicle with said internal combustion engine mounted thereon is running on a rough road, based on indication of deteriorations in combustion by said variance data in plural cylinders, respectively, during the operation of the internal combustion engine in the vicinity of the lean burn limit air/fuel ratio, when said revolution variance has taken a value on a deteriorated combustion side of a first combustion state determining threshold at least as many times as a predetermined count during a predetermined period spanning over plural ignition strokes, said variance data are calculated as revolution variance states indicating deteriorations in combustion, respectively, and when as minimal conditions, said variance data have indicated deteriorations in combustion and an average of said variance data on the deteriorated combustion side of said combustion state determining threshold has fallen on a deteriorated combustion side of a second combustion state determining threshold.

2. A method for the determination of a rough road in a vehicle with a multi-cylinder internal combustion engine mounted thereon, comprising the steps of:

detecting any revolution variance with respect to each cylinder in said internal combustion engine, each of said revolution variances indicating a deterioration in combustion, said detecting step including detecting an angular acceleration of a rotating shaft, which is driven by said multi-cylinder internal combustion engine, in each specific stroke of each cylinder, calculating, on the basis of the results of the detecting step, variance data relevant to any revolution variance of each cylinder accompanied with a deterioration in combustion during operation of said internal combustion engine at an air/fuel ratio leaner than a stoichiometric air/fuel ratio, first operating said internal combustion engine in the vicinity of a lean burn limit air/fuel ratio on the basis of the results of the calculating step, estimating that the vehicle with the internal combustion engine mounted thereon is running on a rough road, based on indication of deteriorations in combustion by the variance data in plural cylinders, respectively, during the operation of the internal combustion engine in the vicinity of the lean burn limit air/fuel ratio, and subsequent operating the internal combustion engine at a testing air/fuel ratio richer than said air/fuel ratio in the vicinity of said lean burn limit to determine that the vehicle is running on a rough road on the basis of the revolution variances detected during the subsequent operation.

3. The method according to claim 2 for the determination of a rough road in the vehicle with the multi-cylinder internal combustion engine mounted thereon, wherein said variance data are calculated under the operation at the testing air/fuel ratio, and said revolution variances (IAC, VAC) during said operation are detected based on said variance data.

4. The method according to claim 3 for the determination of a rough road in the vehicle with the multi-cylinder internal combustion engine mounted thereon, wherein said vehicle is determined to be running on a rough road when said variance data on plural cylinders under said operation at said testing air/fuel ratio show revolution variances.

5. The method according to claim 4 for the determination of a rough road in the vehicle with the multi-cylinder internal combustion engine mounted thereon, wherein when said vehicle has been determined to be running on a rough road, said internal combustion engine is operated at a rough-road lean air/fuel ratio leaner than said testing air/fuel ratio, and upon detection of a convergence state of revolution variances in said operation, said running on said rough road is determined to have ended.

6. The method according to claim 3 for the determination of a rough road in the vehicle with the multi-cylinder internal combustion engine mounted thereon, wherein when said vehicle has been determined to be running on a rough road, said internal combustion engine is operated at a rough-road lean air/fuel ratio leaner than said testing air/fuel ratio, and upon detection of a convergence state of revolution variances in said operation, said running on said rough road is determined to have ended.

7. The method according to claim 2 for the determination of a rough road in the vehicle with the multi-cylinder internal combustion engine mounted thereon, wherein when said vehicle has been determined to be running on a rough road, said internal combustion engine is operated at a rough-road lean air/fuel ratio leaner than said testing air/fuel ratio, and upon detection of a convergence state of revolution variances in said operation, said running on said rough road is determined to have ended.

8. The method according to claim 7 for the determination of a rough road in the vehicle with the multi-cylinder internal combustion engine mounted thereon, wherein said variance data are calculated under operation at said rough-road lean air/fuel ratio, and the convergence state of said revolution variances in said operation is detected based on said variance data.

9. The method according to claim 8 for the determination of a rough road in the vehicle with the multi-cylinder internal combustion engine mounted thereon, wherein based on detection of no deterioration in combustion in the plural cylinders by said variance data, the convergence state of said revolution variances is detected.

10. A method for the determination of a rough road in the vehicle with the multi-cylinder internal combustion engine mounted thereon, comprising the steps of:

first detecting any revolution variance with respect to each cylinder in said internal combustion engine, each of said revolution variances indicating a deterioration in combustion, said detecting step including detecting an angular acceleration of a rotating shaft, which is driven by the engine, in each specific stroke of each cylinder, calculating, on the basis of the results of the first detecting step, variance data relevant to any revolution variance of each cylinder accompanied with a deterioration in combustion during operation of the engine at an air/fuel ratio leaner than a stoichiometric air/fuel ratio, determining based on said variance data of each cylinder whether said combustion therein is good or not, and next detecting with respect to each cylinder air/fuel ratio changing data required to slightly change the air/fuel ratio for the engine, which is under operation in the vicinity of a lean burn limit air/fuel ratio, toward a leaner side when said combustion is good or toward a richer side when said combustion is not good, the engine being operated in the vicinity of said lean burn limit air/fuel ratio on the basis of the results of the next detecting step, wherein when as minimal conditions, said variance data indicating deteriorations in combustion in plural cylinders have been detected during said operation of the engine in the vicinity of said lean burn limit air/fuel ratio and the air/fuel ratio changing data in at least one of the cylinders during said operation of the engine in the vicinity of the lean burn limit air/fuel ratio continuously motivate to change the air/fuel ratio to said richer side, the vehicle is determined or estimated to be running on a rough road.

11. A method for the determination of a rough road in said vehicle with the multi-cylinder internal combustion engine mounted thereon, comprising the steps of:

detecting, when the engine is operated at an air/fuel ratio leaner than a stoichiometric air/fuel ratio, occurrence of any revolution variances with respect to each cylinder in said internal combustion engine, each of said revolution variances indicating a deterioration in combustion, obtaining, based on the detecting step, combustion determining data in each predetermined sampling period to determine whether combustion is good or not, and setting air/fuel ratio changing data so that the air/fuel ratio for the engine operated in the vicinity of a lean burn limit air/fuel ratio is slightly changed toward a leaner side when said combustion determining data indicate good combustion but the air/fuel ratio for the engine operated in the vicinity of said lean burn limit air/fuel ratio is slightly changed toward a richer side when said combustion determining data indicates a deterioration in combustion, the engine being operated in the vicinity of said lean burn limit air/fuel ratio on the basis of said air/fuel ratio changing data, wherein when the results of a logical determination between the state of an increase or decrease in said combustion determining data and the state of an increase or decrease in said air/fuel ratio changing data on at least one cylinder of the engine during said operation in the vicinity of said lean burn limit air/fuel ratio have indicated results corresponding to a rough-road-running state and other conditions for rough road running have been met with respect to plural ones of the cylinders, said vehicle is determined or estimated to be running on a rough road.

12. The method according to claim 11 for the determination of a rough road in the vehicle with the multi-cylinder internal combustion engine mounted thereon, wherein when one or both of a change of said combustion determining data to a deteriorated combustion side subsequent to a change of said air/fuel ratio changing data toward said richer air/fuel side and a change of said combustion determining data to a good combustion side subsequent to a change of said air/fuel ratio changing data toward said leaner air/fuel side have remained, said vehicle with said internal combustion engine is determined or estimated to be running on a rough road.

13. The method according to claim 11 for the determination of a rough road in the vehicle with the multi-cylinder internal combustion engine mounted thereon, wherein rough road determining data are set so that:

the value of said rough road determining data increases at least when said combustion determining data have changed to said deteriorated combustion side subsequent to the change of said air/fuel ratio changing data toward said richer air/fuel side or when said combustion determining data have changed to said good combustion side subsequent to the change of said air/fuel ratio changing data toward said leaner air/fuel side and, the value of said rough road determining data decreases at least when said combustion determining data have changed to said good combustion side subsequent to the change of said air/fuel ratio changing data toward said richer air/fuel side or when said combustion determining data have changed to said deteriorated combustion side subsequent to the change of said air/fuel ratio changing data toward said leaner air/fuel side; and when said rough road determining data have become greater than a predetermined value, said vehicle is determined or estimated to be running on a rough road.

14. The method according to claim 11 for the determination of a rough road in the vehicle with the multi-cylinder internal combustion engine mounted thereon, wherein said method comprises:

detecting an angular acceleration of a rotating shaft, which is driven by said internal combustion engine, in each specific stroke of each cylinder; and calculating, on the basis of the results of the detection, said combustion determining data.

15. The method according to claim 11, wherein the engine is provided with plural cylinders;

further comprising the steps of:

detecting an angular acceleration of a rotating shaft, which is driven by the engine, in each specific stroke, determining, based on the results of the detection, combustion state indicating data every combustion of each cylinder, said combustion state indicating data corresponding to whether combustion is good or not, calculating said combustion determining data with respect to each cylinder on the basis of said combustion state indicating data in a predetermined sampling period, and setting said air/fuel ratio changing data from said combustion determining data with respect to each cylinder; and when the results of a logical determination between the state of an increase or decrease in said combustion determining data and the state of an increase or decrease in said air/fuel ration changing data on at least one of said cylinders have indicated results corresponding to a rough-road-running state and said combustion state indicating data on plural one of said cylinders have indicated a rough-road-running state, the vehicle is determined to be running on a rough road.

16. The method according to claim 15, wherein based on indication of said results corresponding to said rough-road-running state by said results of said logical determination between said state of the increase or decrease in said combustion determining data and said state of increase or decrease in said air/fuel ratio changing data and also on departure of said combustion state indicating data from a predetermined range set by an upper value and a lower value, the vehicle is determined to be running on a rough road.

17. The method according to claim 16, wherein based on indication of said results corresponding to said rough-road-running state by said results of said logical determination between said state of the increase or decrease in said combustion determining data and said state of the increase or decrease in said air/fuel ration changing data and also on production of a state greater than said upper value by said combustion state indicating data at least as many times as a predetermined first count and production of a state smaller than said lower value by said combustion state indicating data at least as many times as a predetermined second count, both, in said predetermined sampling period, the vehicle is determined to be running on a rough road.

* * * * *